(12) United States Patent
Pires et al.

(10) Patent No.: US 6,837,429 B2
(45) Date of Patent: Jan. 4, 2005

(54) SYSTEM AND DEVICE FOR STORING OBJECTS

(75) Inventors: Manuel Pires, Southbury, CT (US); Russell Moskwa, Mansfield Center, CT (US)

(73) Assignee: Morse Watchmans Inc., Oxford, CT (US)

( * ) Notice: Subject to any disclaimer, the term of this patent is extended or adjusted under 35 U.S.C. 154(b) by 0 days.

(21) Appl. No.: 10/617,638

(22) Filed: Jul. 11, 2003

(65) Prior Publication Data

US 2004/0007619 A1 Jan. 15, 2004

Related U.S. Application Data

(63) Continuation of application No. 10/199,886, filed on Jul. 19, 2002, now Pat. No. 6,592,028, which is a continuation of application No. 09/679,099, filed on Oct. 4, 2000, now Pat. No. 6,431,438, which is a continuation of application No. 08/407,275, filed on Apr. 20, 1995, now Pat. No. 6,131,808, which is a continuation of application No. 08/099,837, filed on Jul. 29, 1993, now abandoned.

(51) Int. Cl.[7] ............................................. G06F 17/60
(52) U.S. Cl. ........................ 235/385; 235/375; 235/381; 235/382
(58) Field of Search ................................ 235/375, 381, 235/382, 383, 385; 705/28

(56) References Cited

U.S. PATENT DOCUMENTS 4,549,170 A * 10/1985 Serres et al. ............. 340/568.1
4,661,806 A * 4/1987 Peters et al. ............. 340/568.1

* cited by examiner

Primary Examiner—Michael G. Lee
Assistant Examiner—Seung H Lee
(74) Attorney, Agent, or Firm—Carmody & Torrance LLP

(57) ABSTRACT

The invention relates to a storage system and identification device for storing objects associated with the devices in stations. Each identification devices includes awl electronic memory device with a unique code. The storage system receives information relating each identification device with both its code and its associated object. A user can enter information as to a particular object and the system identifies the location of the station holding the identification device. Thus, identification devices can be returned randomly. This can be used for many objects as small as keys and very large objects connected to the identification devices.

14 Claims, 36 Drawing Sheets

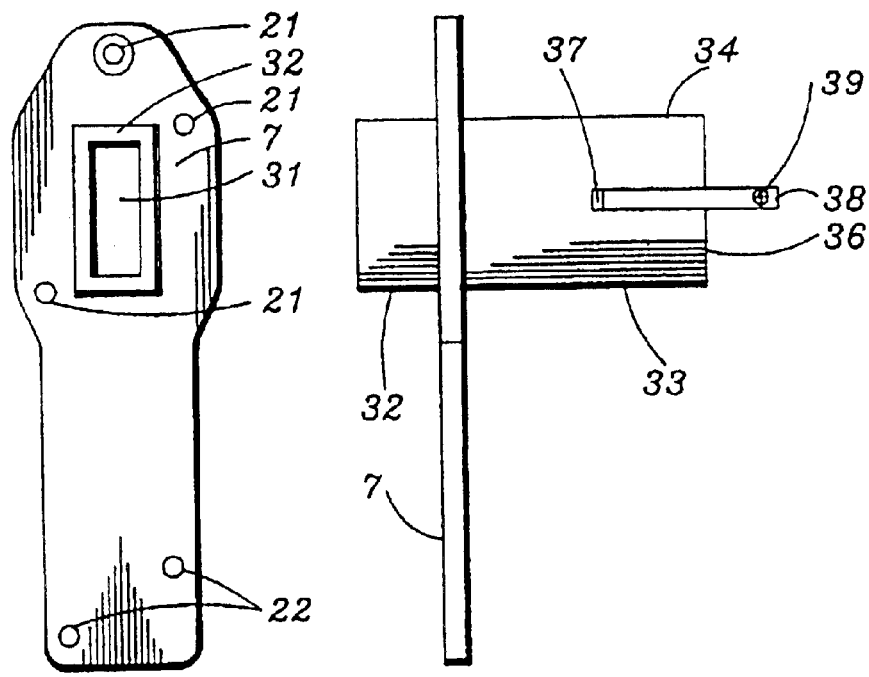
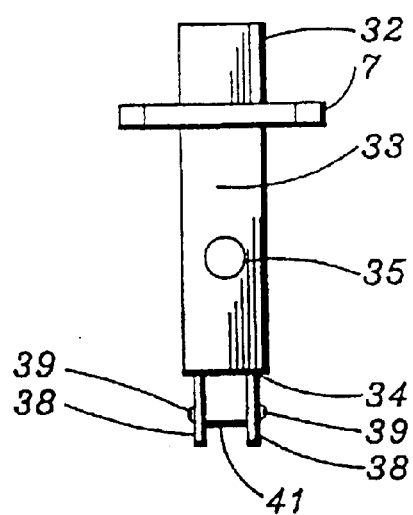
Fig. 6   Fig. 7
Fig. 8

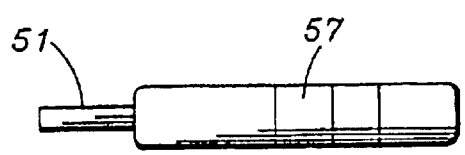
Fig. 10
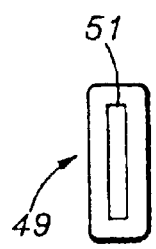 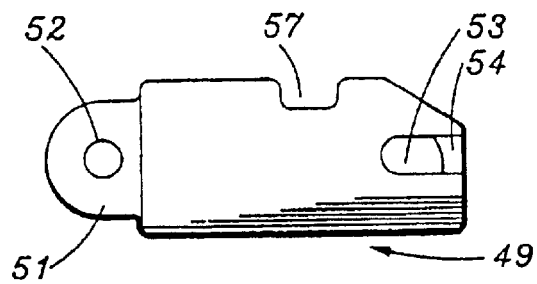 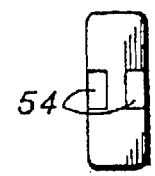
Fig. 12        Fig. 9        Fig. 11
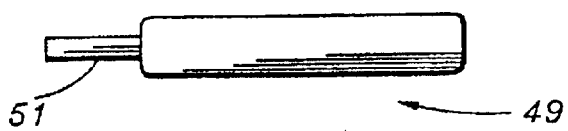
Fig. 13

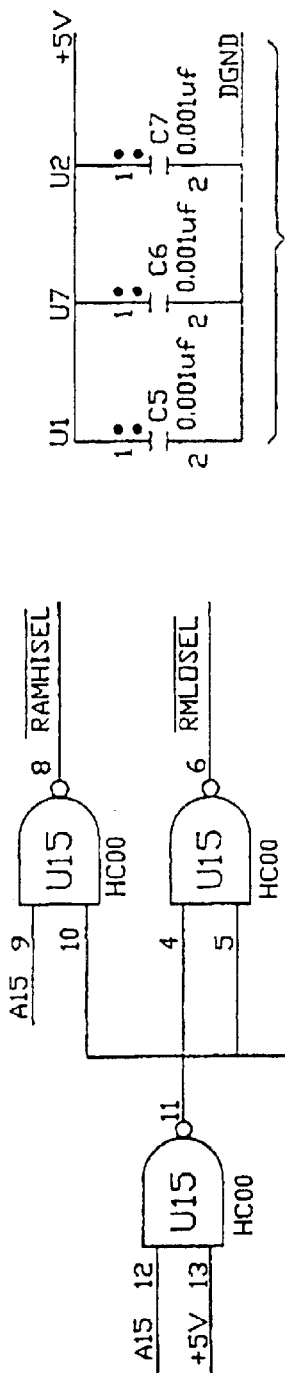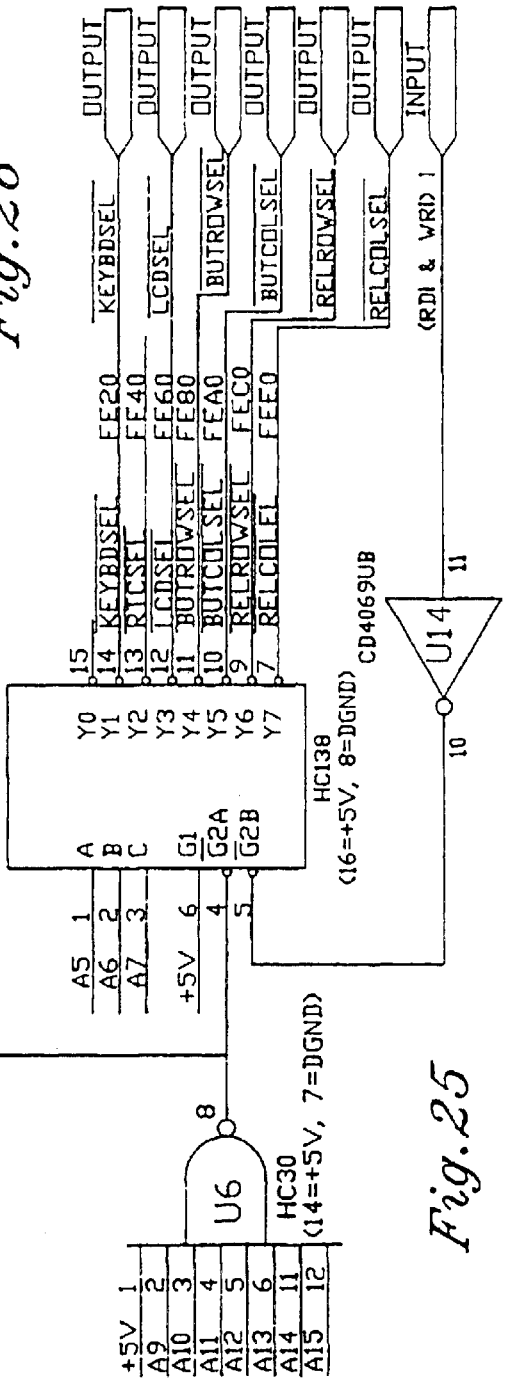
Fig.26
Fig.25

US 6,837,429 B2

SYSTEM AND DEVICE FOR STORING OBJECTS

RELATED U.S. APPLICATION DATA

Continuation of application Ser. No. 10/199,886, filed Jul. 19, 2002, now U.S. Pat. No. 6,592,028, which is a continuation of application Ser. No. 09/679,099, filed Oct. 4, 2000, now U.S. Pat. No. 6,431,438, which is a continuation of application No. 08/407,275, filed Apr. 20, 1995, now U.S. Pat. No. 6,131,808, which is a continuation of application Ser. No. 08/099,837, filed Jul. 29, 1993, now abandoned.

The disclosure of U.S. patent application Ser. No. 08/407,275 is incorporated by reference as if fully set forth herein.

The present invention relates to a system and device for storing objects, and more particularly to a system and device for storing objects at random positions, identifying the position of a desired object, and removing the object.

BACKGROUND OF THE INVENTION

The storing of objects such as keys is a common problem for automobile dealers, hotels, hospitals and numerous other companies and institutions. For many cases, it is desirable to have a record of the user of a key in the event that the key is needed by another person. The are many situations in which the keys must be secured so that there is no unauthorized use of the keys in general and the person taking a key should be identified and authorized for the use of the key. Sign out sheets are sometimes used but often the person taking a key is negligent in keeping records, or possibly forgetful, or is convinced that the short use of the key does not require the awkward procedures of "signing-out" and "signing-in" for the key. Such a system has many obvious problems, not to mention the severe problem of personnel turn-over and the possibility that an important key may be kept by a fired or disgruntled ex-employee.

U.S. Pat. No. 4,673,915 to Cobb describes a key storage and monitoring system in which keys are stored on specific associated pegs. Each peg has a dial which must be turned to release a key and the person removing the key can turn the dial to show a code so a subsequent person can identify who has a missing key. The Cobb system, however, requires the cooperation of the users because the patent indicates that rotation of the dial releases a key, not entry of a code. The system has many other weaknesses including the severe requirement that the keys be returned to predetermined locations. The system has highly limited security because it allows users to obtain keys even if the users fail to enter the correct information.

Although the secure storage and access for keys is important, there are many other objects, often much larger, which also require secure storage. It is preferable that a secure storage system have different levels of security so that some employees may be assigned access to specified groups of objects while a manager may have access to all objects. It is also preferable that a secure storage system require users to enter information as a prerequisite to the removal of an object and that at any time inform ation as to the removal and return of objects be readily available.

Furthermore, it is preferable that the secure storage system allow the random positioning of returned objects while providing all the information about the past and current disposition of the objects.

The present invention overcomes the weaknesses and drawbacks of the prior art and provides a storage system and device for the secure storage of objects which requires user information before an object can be removed and allows the return of the object at a random position in the storage system. In addition, the invention allows the generation of reports relating to the activity of the users of the objects.

SUMMARY OF THE INVENTION

The present invention provides a storage system and device for the storage of randomly positioned objects such as keys and the identification of the position of a desired key by entering predetermined information into the system. The invention can also provide for the controlled access to the objects while maintaining records of activities.

One embodiment of the invention is a storage system including a housing; a plurality of station means in the housing and a plurality of holding means each bong operable for being connected to an associated object Each of the station means and each of the holding means are operable to be engaged and disengaged to each other, each of the holding means includes an associated identification means operable to include an electronic memory with a code and to be read electronically to enable an identification of its associated holding means; reading means in the housing operable for reading each of the identification means whenever one of the holding means is engaged in a station means; control means in the housing operable for controlling the reading means to read the identification means; input means coupled to the reading means for obtaining information relating to the holding means; and display means operable for displaying information entered in the input means and information from the reading means.

In another embodiment, the invention also includes a memory means coupled to the reading means and operable for retaining information relating to the positions of the holding means engaged in the station means and information relating to the disengagement and engagement of the holding means relative each station means.

Yet in another embodiment, the invention also relates to the control means being programmable to designate code requirements prior to the disengagement of one of the holding means.

Still another embodiment features locking means operable to retain each holding means engaged in its station means unless a predetermined code is entered.

In a different embodiment, the invention relates to a device suitable for being engaged and disengaged by a system including a microprocessor system operable for reading electronic memory devices, inputting means operable for inputting information, and display means operable for displaying information. The device includes a body; and an electronic memory means in the body operable for storing a unique code and for being read electronically when the body is engaged by the system. The body is adapted to allow the electronic memory means to be read when the body is engaged into the system and display the location of body in the system upon the entry of suitable information using the input means.

Another embodiment of the device includes the device having a mechanical shape suitable for being interlocked into the system when the device is engaged in a system having a locking means operable to engage the mechanical shape and to be disengaged upon entry of suitable information in the input means.

Other embodiments, features and advantages of the invention will become apparent upon reading the specification and claims.

IN THE DRAWINGS

For a fuller understanding of the nature and objects of the invention, reference should be had to the following detailed description, taken in conjunction with the accompanying drawings in which:

FIG. 6 is a front elevational view of an outer shell of the station shown in FIG. 5;

FIG. 7 is a side elevational view of the outer shell shown in FIG. 6;

FIG. 8 is a bottom elevational view of the outer shell shown in FIG. 6;

FIG. 9 is a side elevational view of one embodiment of a identification devil according to the invention.

FIG. 10 is a top elevational view of the identification device shown in FIG. 9,

FIG. 11 is one end elevational view of the identification device shown in FIG. 9;

FIG. 12 is another end elevational view of the identification device shown in FIG. 9;

FIG. 13 is a bottom elevational view of the identification device shown in FIG. 9;

FIGS. 20–35 show the electrical circuits for the storage system shown in FIG. 1.

DETAILED DESCRIPTION OF THE PREFERRED EMBODIMENTS

Figure 1:
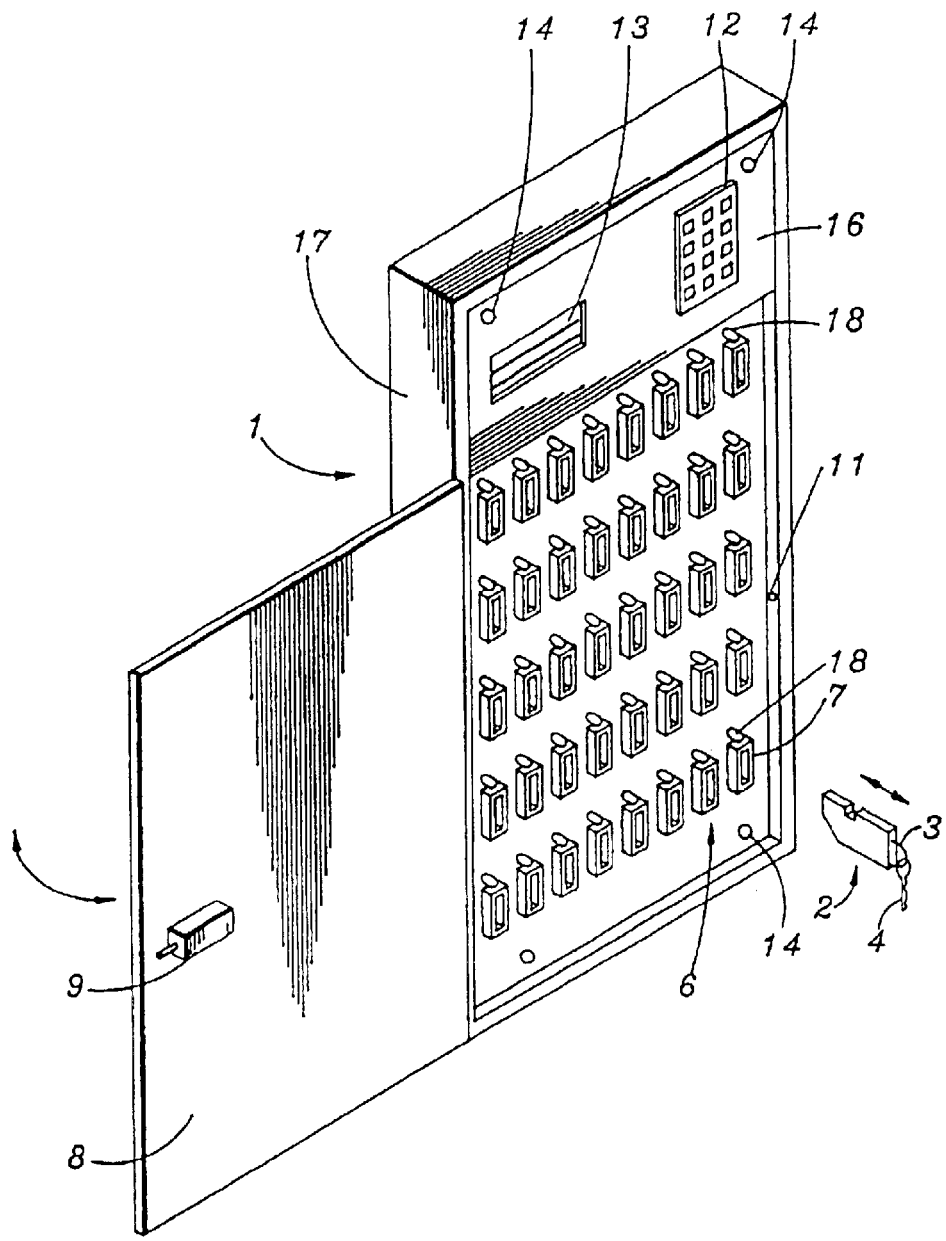
FIG. 1 is a front perspective view of a system and a device according to the invention.

FIG. 1 shows storage system 1 and identification device 2 according to the invention. For the particular embodiment shown in FIG. 1, the device 2 is connected by wire 3 to a key 4. The identification device 2 is engaged into a station 6 in the form of a receptacle 7. Door 8 can be closed to prevent access to keys being stored therein by lock 9 which can be operated by a key (not shown) to have the lock 9 engage opening 11. The door 8 can also be locked using a station 6 and a projecting shape similar to a portion of the identification device 2 as will be described herein.

Figures 2, 3:
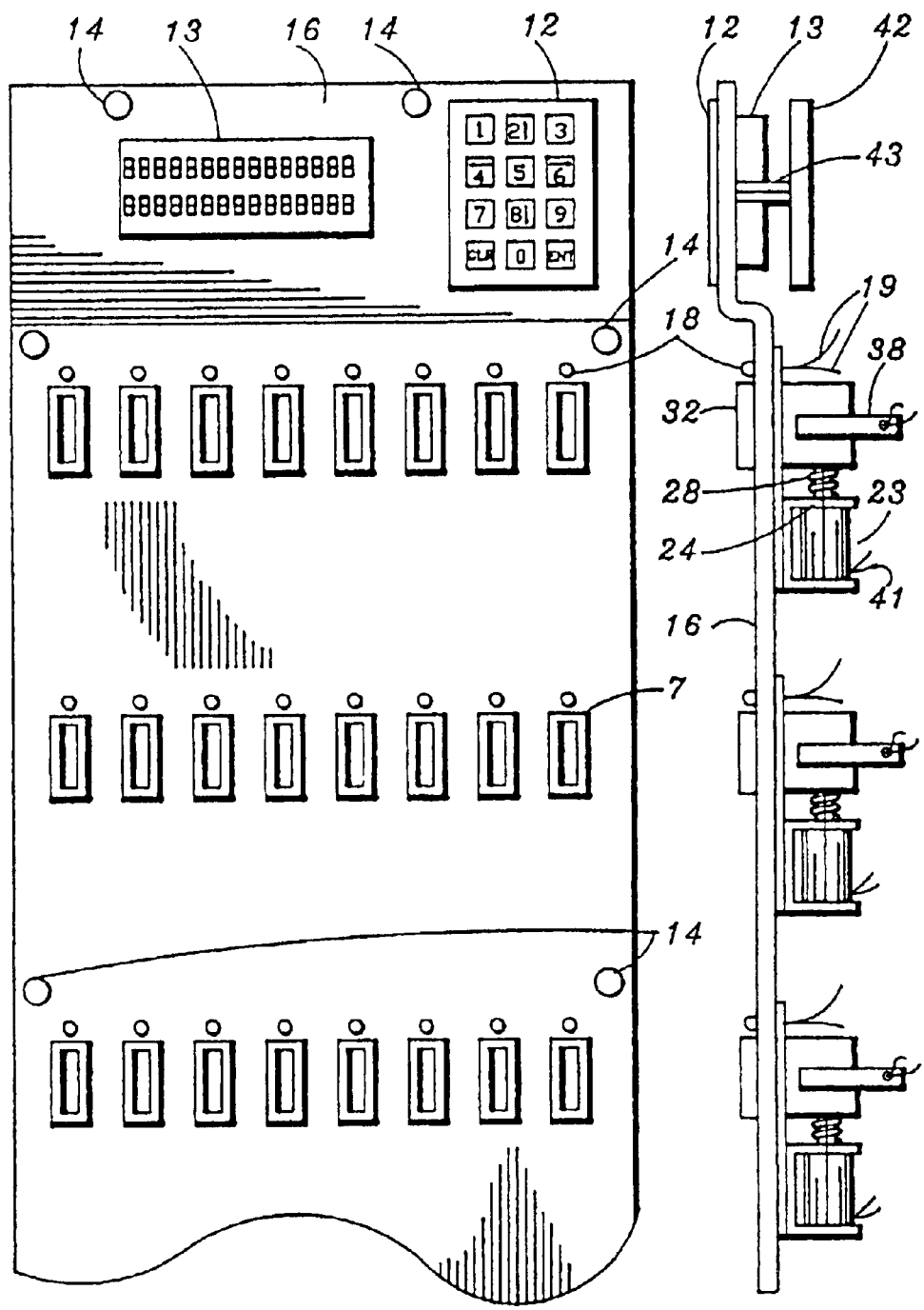
FIG. 2 is a partial front elevational view of a portion of the system shown in FIG. 1.
FIG. 3 is a side elevational a view of the portion of the system shown in FIG. 2.
Figure 4:
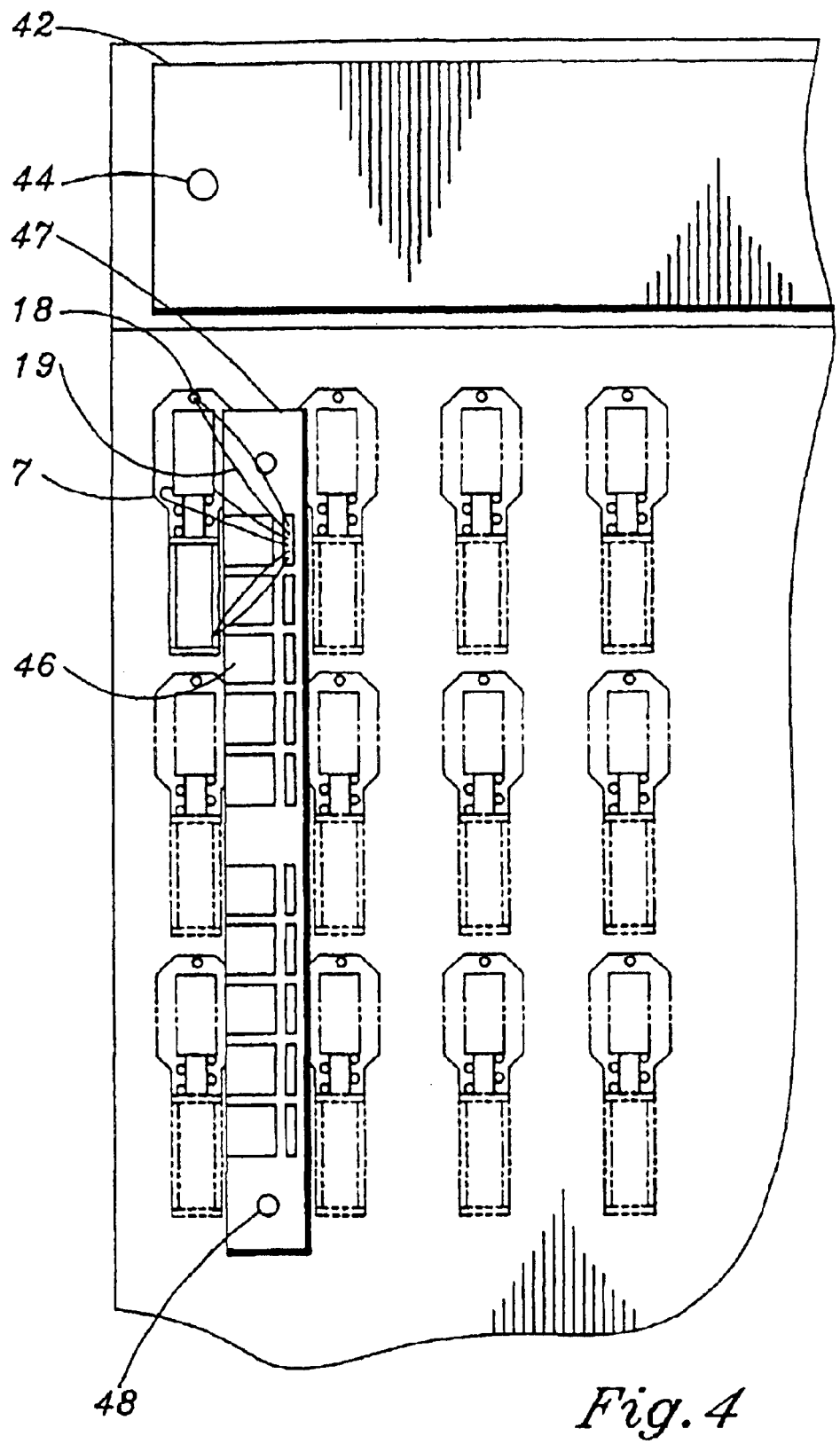
FIG. 4 is a partial rear elevational view of another portion of the system shown in FIG. 1.

FIGS. 2–4 show other views of portions of the storage system 1. A keyboard 12 is used for entering information by a user. The keyboard 12 is preferably a membrane type keyboard with normally opened contacts. As shown in FIG. 2, the numerals on the keyboard 12 in the top row are "1" to "3' with the numeral "2'also serving as the 'up arrow" for the cursor which appears on display 13. The second row, has the numerals "4" to "6" and numerals "4" and "6" are the "left arrow" and right arrow", respectively, for the cursor. The next row has the numerals "7" to "9" and the "8" is also the "down arrow" for the cursor. The last row has the designations, "CLR" for clearing characters from the display 13; a "0" as the last digit after "9"; and "ENT" for entering data. The display 13 is a LCD with two character lines, each having sixteen characters. A cursor is indicated in the display 13 to show where data will appear or where data will be cleared.

Mounting bolts 14 can be commercially available security type to limit possible access or tampering within the storage system 1. The bolts 14 retain frame 16 attached to housing 17.

Each of the stations 6 has an associated light source such as LED 18. The LED 18 is used to assist a user in identifying the location of a station and it will be described in detail herein.

The following is a general description of the use of the storage system 1 and the identification device 2. For the embodiment shown in FIG. 1, the storage system 1 has forty stations 6 arranged in an array of five rows and eight columns. Thus, there can be up to forty identification devices 2 stored in the storage system 1.

The storage system 1 has a microprocessor which is programmed to relate each identification device 2 with an associated key 4. If a user enters the identity of a key 4 in keyboard 12, the location of the associated device 2 is indicated. One simple and convenient way for indicating the location is for the LED 18 at the station 6 holding the selected identification device 2 to light. Another more economical way for indicating the location of the desired identification device 2 is for the display 13 to indicate the coordinates by row and column. If the identification devices 2 are ordinarily locked into the respective stations 6, then the selected device 2 is released for a predetermined period of time, say twenty seconds so that the user has an opportunity to disengage or remove the selected identification device 2. Failure to remove the identification device 2 within the predetermined time, results in the selected identification device 2 being locked into place until the proper code has been entered into the keyboard 12 again.

Figure 5:
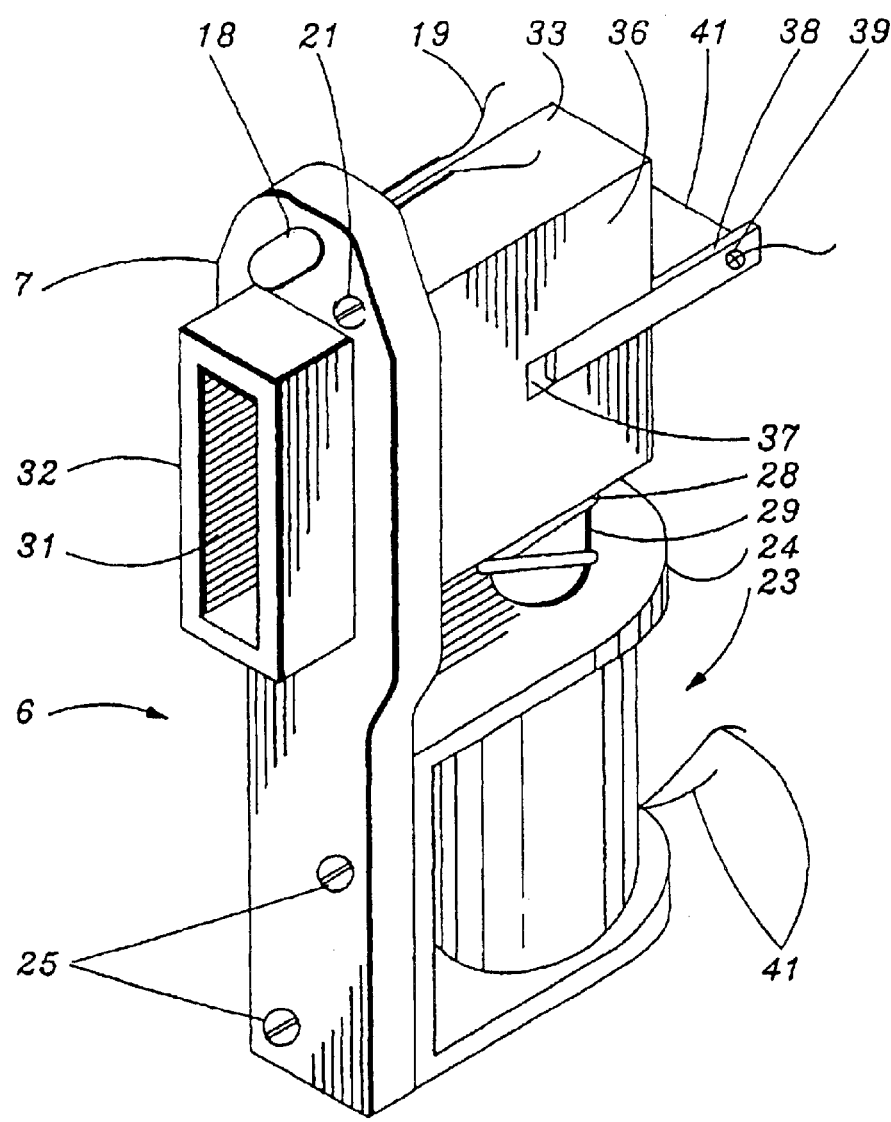
FIG. 5 is a front perspective view of a portion of a station in the system shown in FIG. 1.
Figure 17:
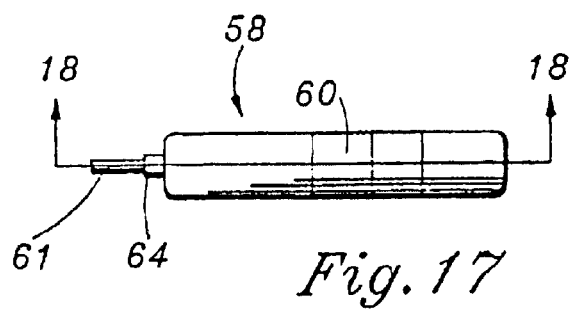
FIG. 17 is another end elevational view of the identification device shown in FIG. 14.
Figures 14, 15, 16:
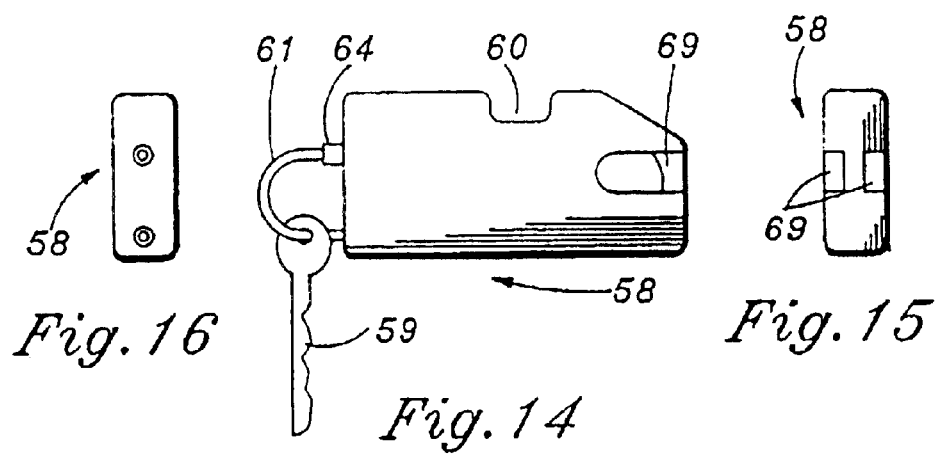
FIG. 14 is a side elevational view of another embodiment of a identification device according to the invention.
FIG. 15 is a top elevational view of the identification device shown in FIG. 14.
FIG. 16 is one end elevational view of the identification device shown in FIG. 14.

FIG. 3 shows a partial side elevational view of the frame 16 with some of the components of the interior of the storage system 1 shown. The LED 18 is shown with its two wire leads 19 in FIGS. 3–5. The LED 18 is mounted in opening 21 defined in receptacle 7 and the receptacle 7 is shown in detail in FIGS. 6–8. In FIG. 6, mounting holes 21 are used for mounting the receptacle 7 on the frame 16. Holes 22 are used for mounting a solenoid 23 into the receptacle 7 as shown in FIG. 5.

Figure 19:
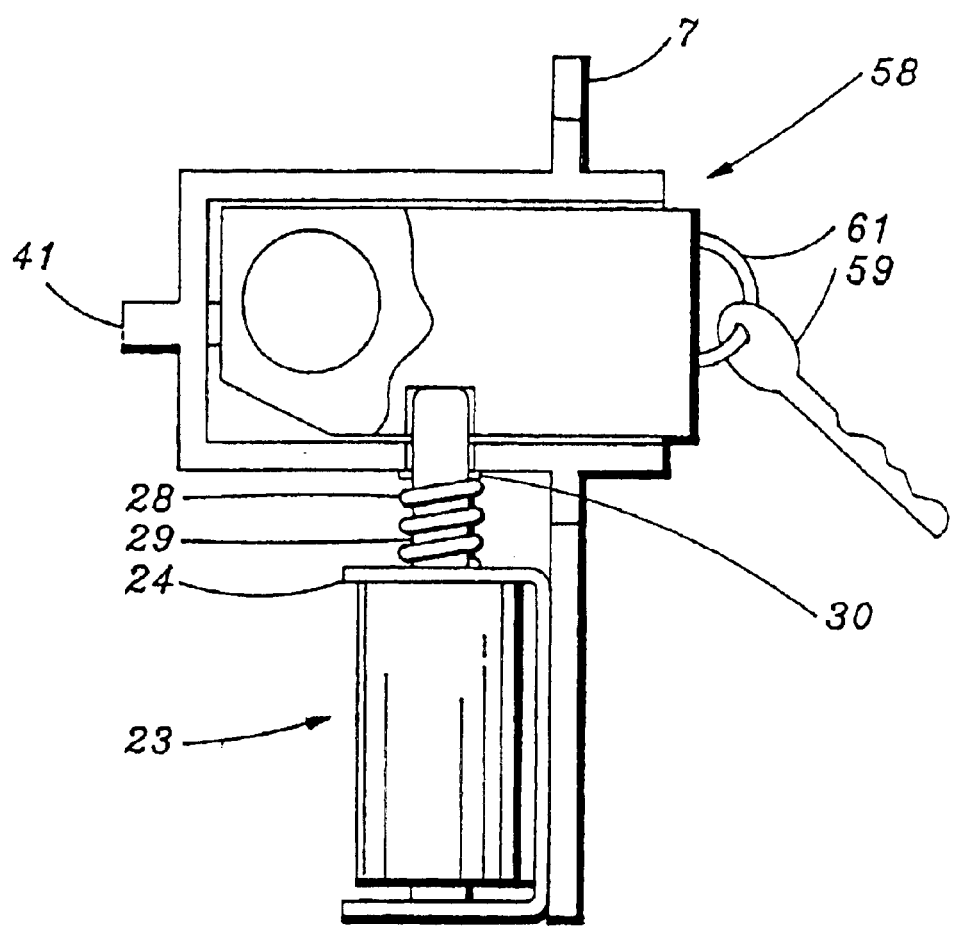
FIG. 19 shows a detail in the arrangement of components in a station relative an identification device engaged therein.

The solenoid 23 includes a metal bracket 24, a wire coil 26 having electrical leads 27, a spring 28, and a plunger 29 responsive to the wire coil 26 so that the plunger 29 is moved down into the wire coil 26. The plunger 29 has a ring 30 as shown in FIG. 19 mounted in a channel (not shown) around the plunger 29 so that the spring 28 urges the plunger 29 upwards when it has been moved down by the wire coil 26. The use of the ring 30 on the plunger 29 is in accordance with the practice in the art.

The receptacle 7 has an opening 31 surrounded by a flange 32. The opening 31 extends into the receptacle 7 to a portion 33 so that the identification device 2 can be engaged into the receptacle 7 by inserting the identification device 2 into the opening 31 moving it until it abut back wall 34. Side walls 36 have rectangular openings 37 and metal contact strips 38 are mounted on each side with screws 39 into extension 41. The metal contact strips 38 penetrate into respective openings 37 and, as will be described below, to make electrical contact the identification device 2 engaged in the receptacle 7. Wires 41 carry the electricity for the control of the solenoid 23.

The receptacle 7 has an opening 35 at the bottom to allow the plunger 29 to reach into the receptacle 7 and lock the identification device 2 engaged in the receptacle 7 as shown in FIG. 19.

The receptacle 7 is preferably made from a resin or plastic thereby providing an insulated body at relatively low manufacturing cost.

FIGS. 3 and 4 provide partial views of components mounted on the fame 16. FIGS. 3 and 4 have omitted details to show the overall relationship between components. A circuit board 42 is mounted on standoffs 43 with bolts 44. The solenoids 23 are preferably controlled by relays 46, in accordance with known practice. The relays 46 are mounted on circuit boards 47 each of which hold ten relays 46. For storage system 1, there are four circuit boards 47. The circuit boards are mounted into the frame 16 with bolts 48.

FIGS. 9–13 show a simple key holder 49 embodiment of the identification device 2. End 51 has an opening 52. A chain, wire or some other suitable form of connection can be made from the key holder 49 to an object such as a key (not shown). It is not at all necessary that the object be limited to a key or even a relatively small object. In fact, the object could be a box, a lawnmower or even a boat. The connection between the object and the key holder 49 enables the controlled use of the object through the storage system 1.

The key holder 49 has a compartment defined in it which contains an electronic memory device 53. Both sides of the key holder 49 are the same and each has an opening 54. The strips 38 shown in FIG. 7 electrically contact each side of the electronic memory device 53 so that the electronic system forming part of the storage system 1 can communicate with the electronic memory device 53. This enables the storage system 1 to learn the relationship between each identification device 2 and its associated object, to determine the position of the identification devices 2, and to maintain records on the removal and return of the devices 2.

The electronic memory device 53 can be a commercially available device such as DS1990 sold by Dallas Semiconductor. The Dallas DS1990 has a factory lasered 64-bit ROM which includes a unique 48-bit serial code, an 8 bit CRC and an 8-bit Family Code (O1h). Data is transferred serially via a single wire protocol which requires a single data lead and a ground return. Hence, two wires and two contacts. The Dallas DS1990 is similar in appearance to a button-type battery and has an outer diameter of about 16.3 mm, a width of about 3.6 mm and electrical contact surfaces on opposite sides. The details of the operation of the Dallas DS1990 are readily available publicly. It is of interest that the nominal operating voltage is about 5.0 volts. This particular characteristic is used to operate the Dallas DS1990 devices in an array according to the invention, as described elsewhere herein.

The electronic memory device 53 can be rotated within the compartment in the key holder 49. The openings 54 are positioned to be off center relative the geometric center of the electronic memory device 53 so that the strips 38 can produce rotation of the electronic memory device 53 when the key holder 49 is inserted into the station 6. Allowing rotation of the electronic memory device 53 while positioned within the key holder 53 reduces wear on the electronic memory device 53 because different surfaces contact the strips 38 due to the rotation of the electronic memory device 53.

In one preferred embodiment, it is desirable to inhibit the removal or disengagement of the identification device 2 from a station 6 unless the intended user is authorized. For this purpose, the key holder 49 has a notched region 57 positioned and dimensioned to be engaged by the plunger 29 which is under the control of the solenoid 23.

The arrangement of the station 6 used to lock the identification device 2 can also be used for locking door 8 by replacing lock 9 with a portion of the device 2 positioned to engage one of the stations 6. To open the door 8, the correct code would be entered into the keyboard 12. There would be 39 stations 6 still available for storing identification devices 2.

Figure 18:
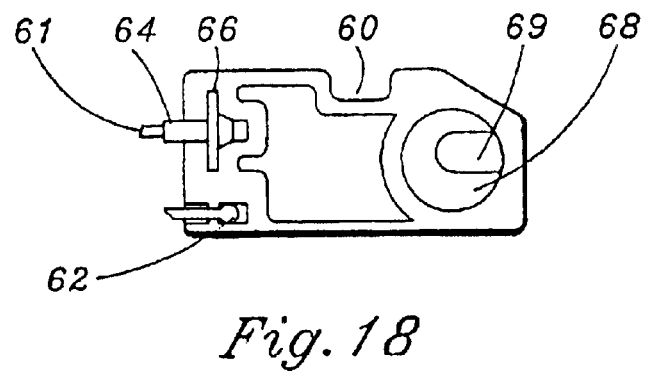
FIG. 18 is a sectional view of FIG. 17 along line 18—18.

FIGS. 14–18 show another key holder 58 suitable for use as the identification device 2. In this embodiment, a key 59 is connected to the key holder 58 by a wire 61 which has commercially available security connectors. One end of the wire 61 has a ball 62 which is positioned in compartment 63 defined in the interior halves of the key holder 58, as shown in FIG. 18. The other end of the wire 61 has a cylindrical rod 64. A metal plate 66 is positioned within the key holder 58 and has a hole to receive the rod 64. This hole is cut in a well known design to allow the opening to increase in size to receive the rod 64; however, removal of the rod 64 is severely inhibited.

The key holder 58 can be provided to a user so that the user can connect a selected key easily and the security connection will prevent any surreptitious change or removal of the key.

The key holder 58 has a notched region 60 for engagement with the plunger 29 as shown in FIG. 19. The position of ring 30 on the plunger 29 results in the plunger 29 being pushed up until the ring 30 presses against the bottom of the receptacle 7 so that pressure is not established against the key holder 58. This arrangement avoids unnecessary pressure and possible damage to the key holder 58.

FIG. 18 shows compartment 68 for the electronic memory device 53. In addition, opening 69 accommodates electrical contract strips 38.

Reference is now made to the electrical circuit shown in FIGS. 20–35. The microprocessors, chips, analogue components, digital components and the like are commercially available and the component designations are shown under the various components in the drawings. Connection of lines from one figure to another can be followed because the lines are labeled. As it will be pointed out, certain circuits are repeated and so only one typical arrangement is shown. Standard terminology and well known techniques of abbreviations have been used to simplify the circuit description.

Generally, the stations 6 are arranged in a matrix array of vertical columns and horizontal rows as can be seen in FIG. 1. As indicated above, the electronic memory device 53 has the general shape of a button so the abbreviation "BUT" in the FIGS. 20–35 is for the term "button" which refers to the electronic memory devices 53. Further elaboration on this simplified form of designation will be provided during a detailed description of the figures.

In the FIGS. 20–35, the various components have been shown using drawing shapes and designations in accordance with the practice in the art. The numerals within a block such as block U1 in FIG. 20 correspond to the designations of the commercially available component. The external numerals are for conveniently tracing lines. For convenience, the actual arrangement of the terminals have been arranged to group similar functioning terminals together rather than show the actual physical positions for the components.

Figure 20A:
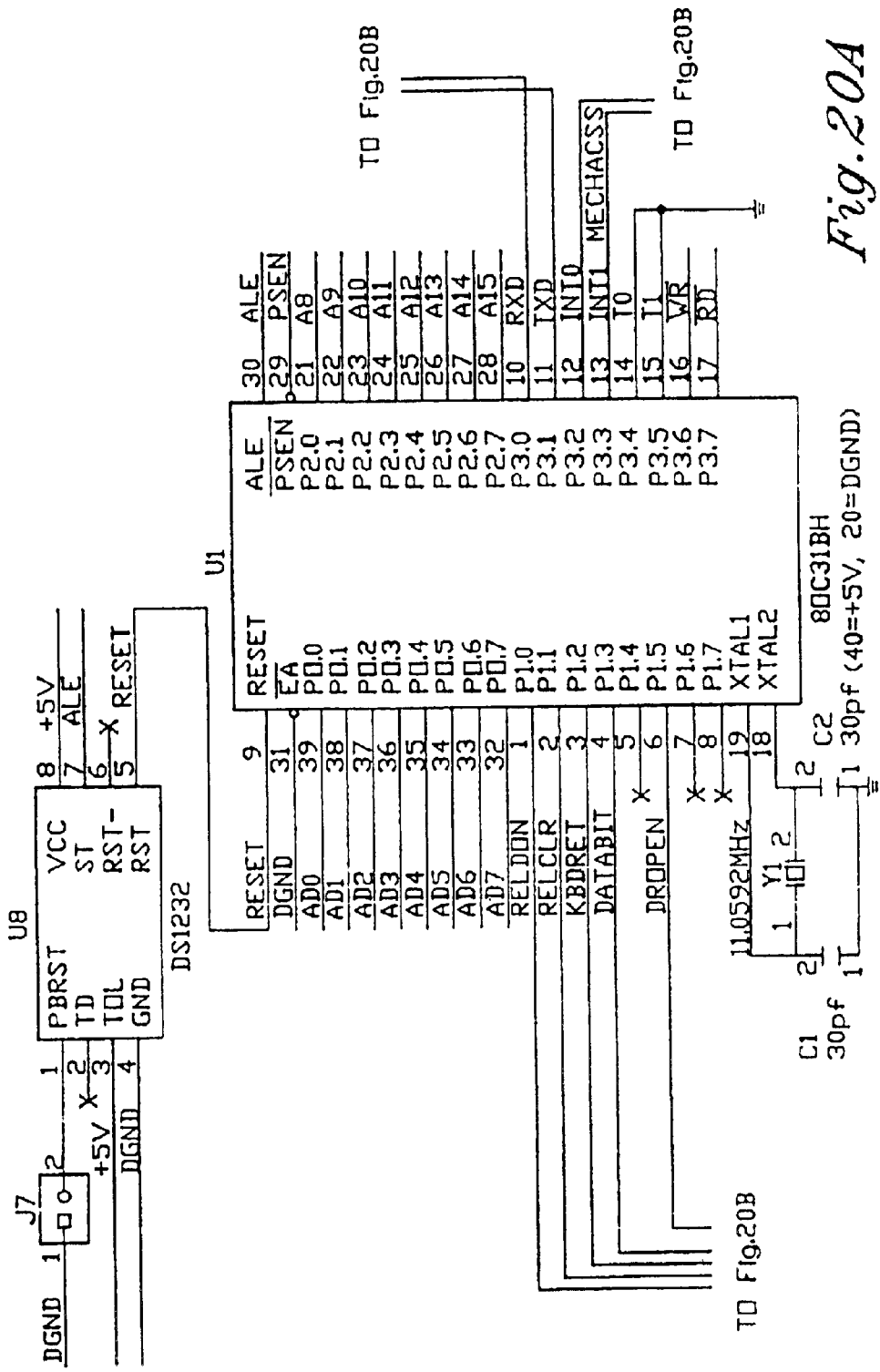
Figure 20B:
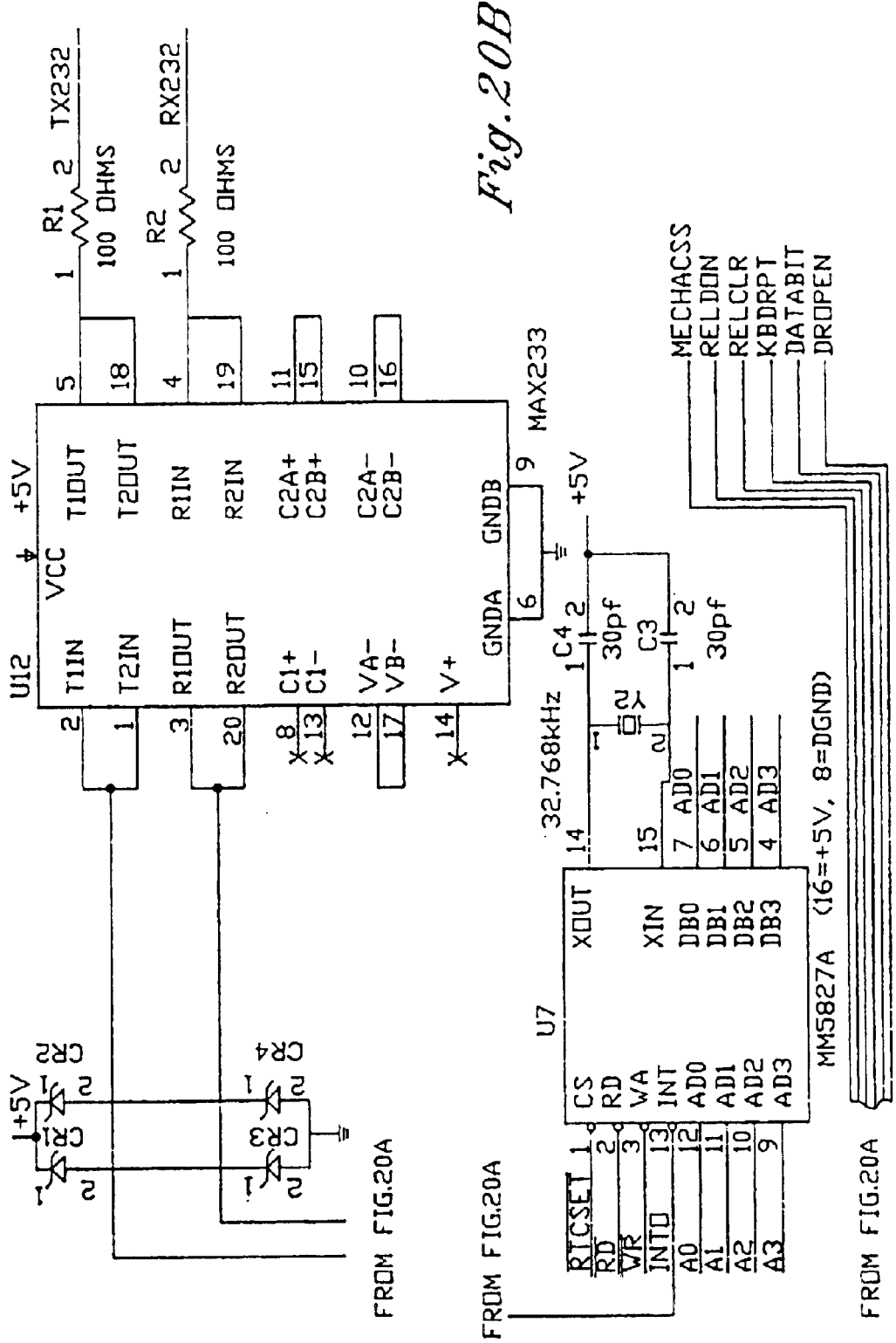

Referring now to FIG. 20, block U1 is a microprocessor available from Intel as component number 80C1BH. As noted the designations within the block U1 correspond to the designations used by Intel in its technical specifications while the designations of the lines from the block U1 are for distinguishing the lines and to suggest the relationship a line has in the operation. For example, the line designated "RESET" relates to the reset function.

Some of the other lines from block U1 will also be described, however, detailed information on the lines for block U1 as well as all of the other components can be obtained from commercially available literature. The line "DGND" is a digital ground. The lines "AD0" to "ADT" are multiplexed address data lines. The line "RELDON" is for the relay "D" being "on". The line "RELCLR" (shown with a bar over the designation) is a single bit line for turning off relays 46 after powering up for initialization. The line "KBDRET" is a return line from the keyboard 12. The line "DATABIT" goes to the electronic memory devices 53 connected into the storage system 1 when the identification devices 2 are engaged with the stations 6. Some lines are unused such as lines "T0" and "TI" which are grounded. Lines "A8" to "A15" are single address lines. Line "RXD" is a receive line while line "TXD" is a transmit line. Line "WR" (shown with a bar over the description) is a "write pulse" line while line "RD" (shown with a bar over the designation) is a "read Pulse" line.

Terminals "18" and "19" of block U1 are connected to a well known crystal circuit for producing a timing signal. The "RESET" line of block U1 is connected to block U8 which is a commercially available power reset circuit designated as component "DS12320". Block U8 is connected to a standard jumper 17 which can be used to manually reset the microprocessor, block U1.

The sub-circuit with Zener diodes CR1–CR4 serves as a noise suppressor. The block U12 is a line driver and receiver and is component MAX233 available from Maxim Corporation. Block U7 is a real time clock available from National Semiconductor as component MM58274. Block U7 has a crystal circuit coupled to line 14 and 15 and including crystal Y2. One side each of capacitors C4 and C5 has an applied voltage of +5 volts, as indicated. The lines TX232 and RX232 can be used for a printer or computer.)

Figure 21:
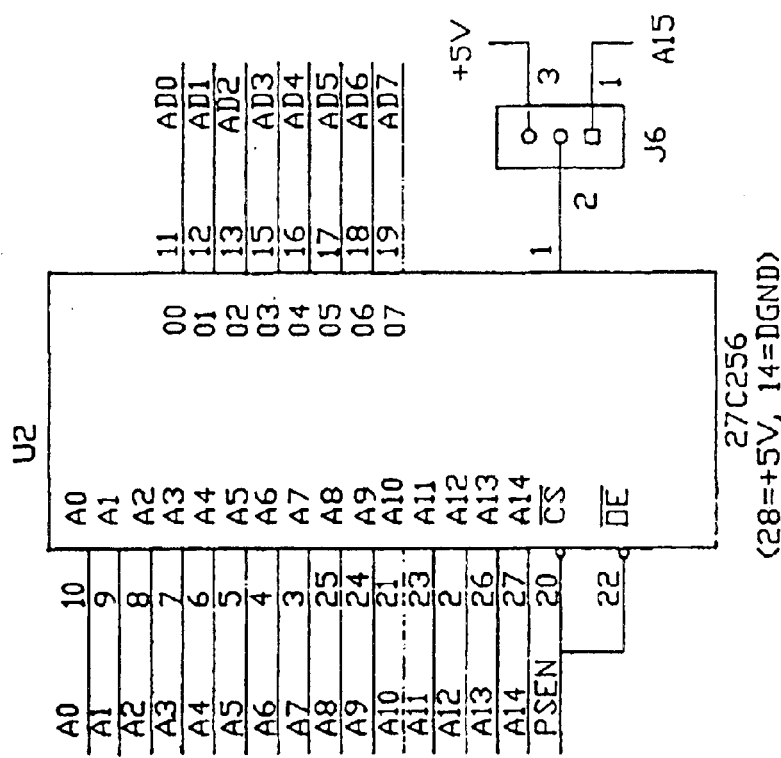

FIG. 21 shows block U2 which is a programmable read only memory (PROM) available from Intel as component 27C256. For this circuit, block U2 has a memory of 32 k.

Figure 22:
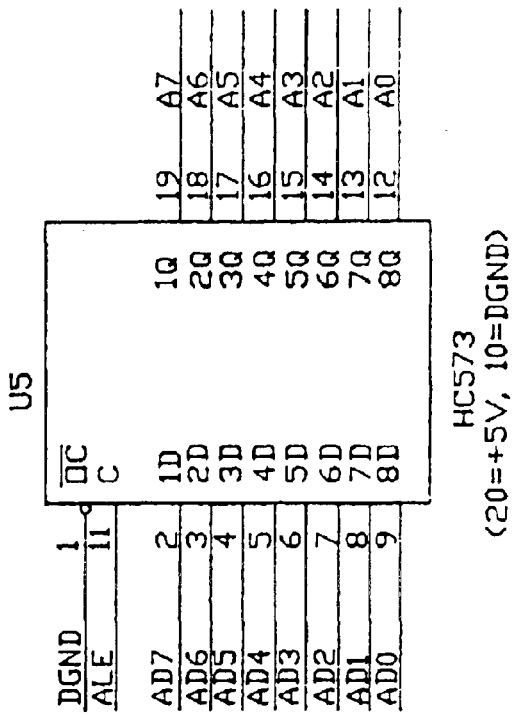
Figure 24:
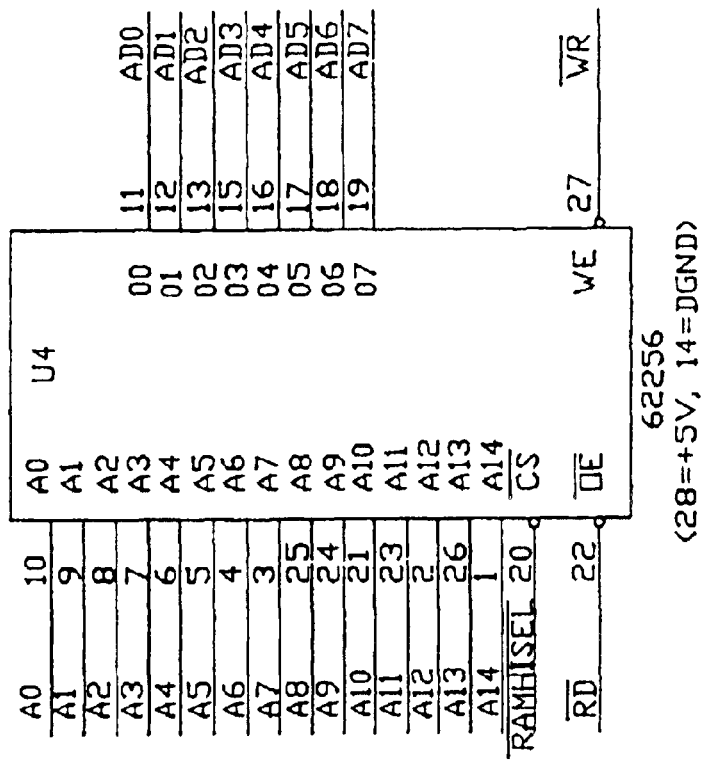
Figure 23:
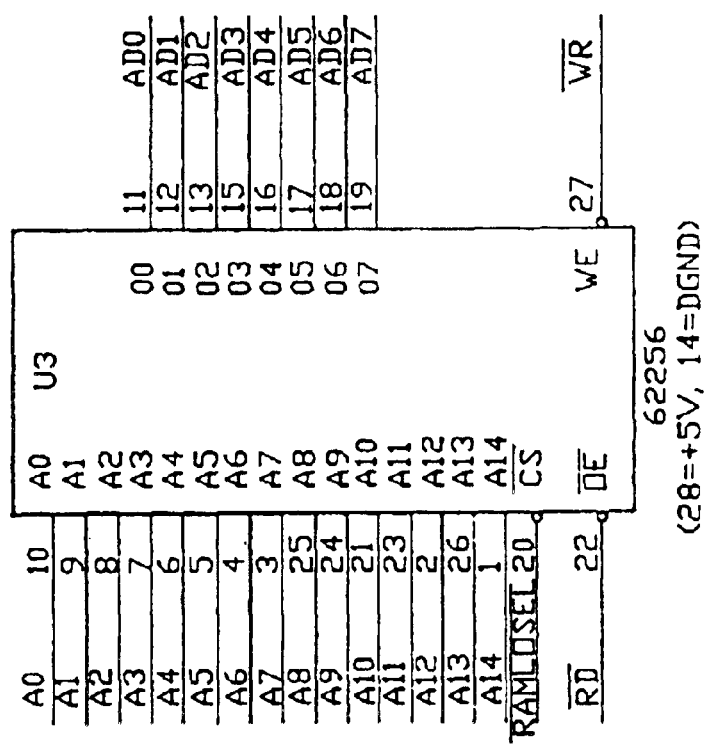

FIG. 22 shows block U5 which is an address latch commercially available as component 74HC573. FIG. 23 shows block U3 which is a random access memory (RAM) available from Toshiba as component 62256. The lines AD0–AD7 are read/write lines. Block US has a memory of 32 k. FIG. 24 shows block U4 which is a static random access memory (SRAM) commercially available as component 62256. Here again, lines AD0–AD7 are shown and are read/write lines. Block U4 has a memory of 32 k.

FIG. 25 shows a portion of the electrical circuit which does address decoding. Blocks U15 and U6 are NAND gates and block U14 is an invertor available commercially as component CD4069UB. Block U9 is a 3-to-8 decoder sometimes referred to in the art as a "3 line to 8 line decoder". The lines out of block U9 provide a memory map of the input-output (I/O). Block U9 is commercially available as component 74HC138. FIG. 26 shows decoupling capacitors C5, C6 and C7 which are physically positioned near blocks U1, U7, and U2, respectively in accordance with well known practices FIG.

Figure 27:
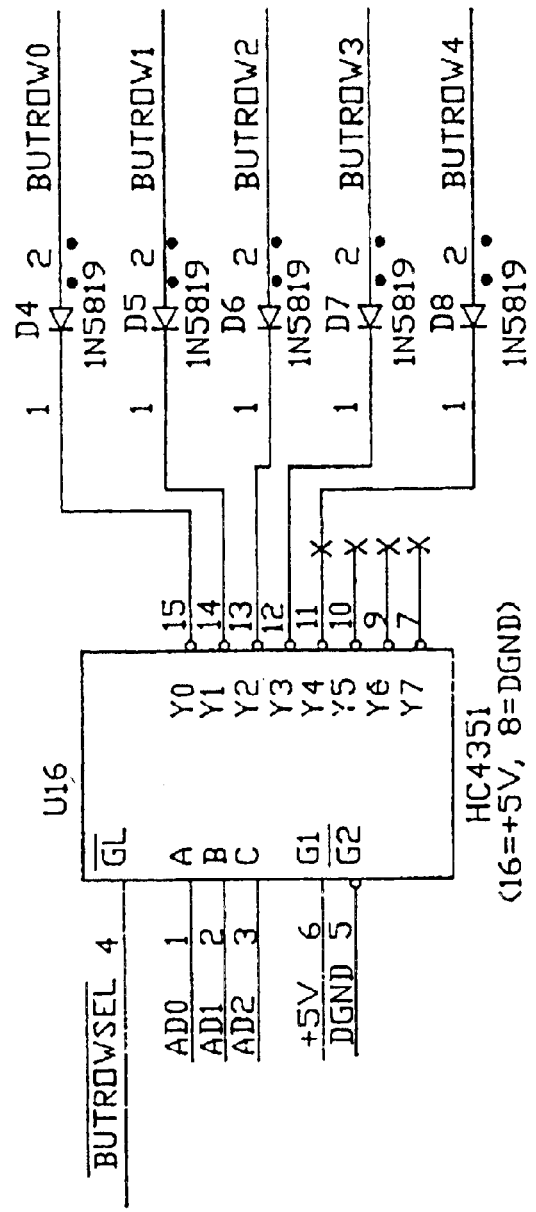

FIG. 27 shows block U16 which is a 3 to 8 decoder and it is not latchable. Block U16 is commercially available as 74HC137. Block U16 shows the use of nomenclature to suggest the role of lines in the electrical operations. The line "BUTROWSEL" (shown with a bar over the description) suggests that it is for selecting a button (electronic memory device 53). The output lines BUTROW0 to BUTROW4 provide grounding lines to each of the live button rows. Each of these lines include a diode D4–D8, respectively, to provide a relatively high reverse bias so that there is no grounding unless grounding is commanded.

Figure 28:
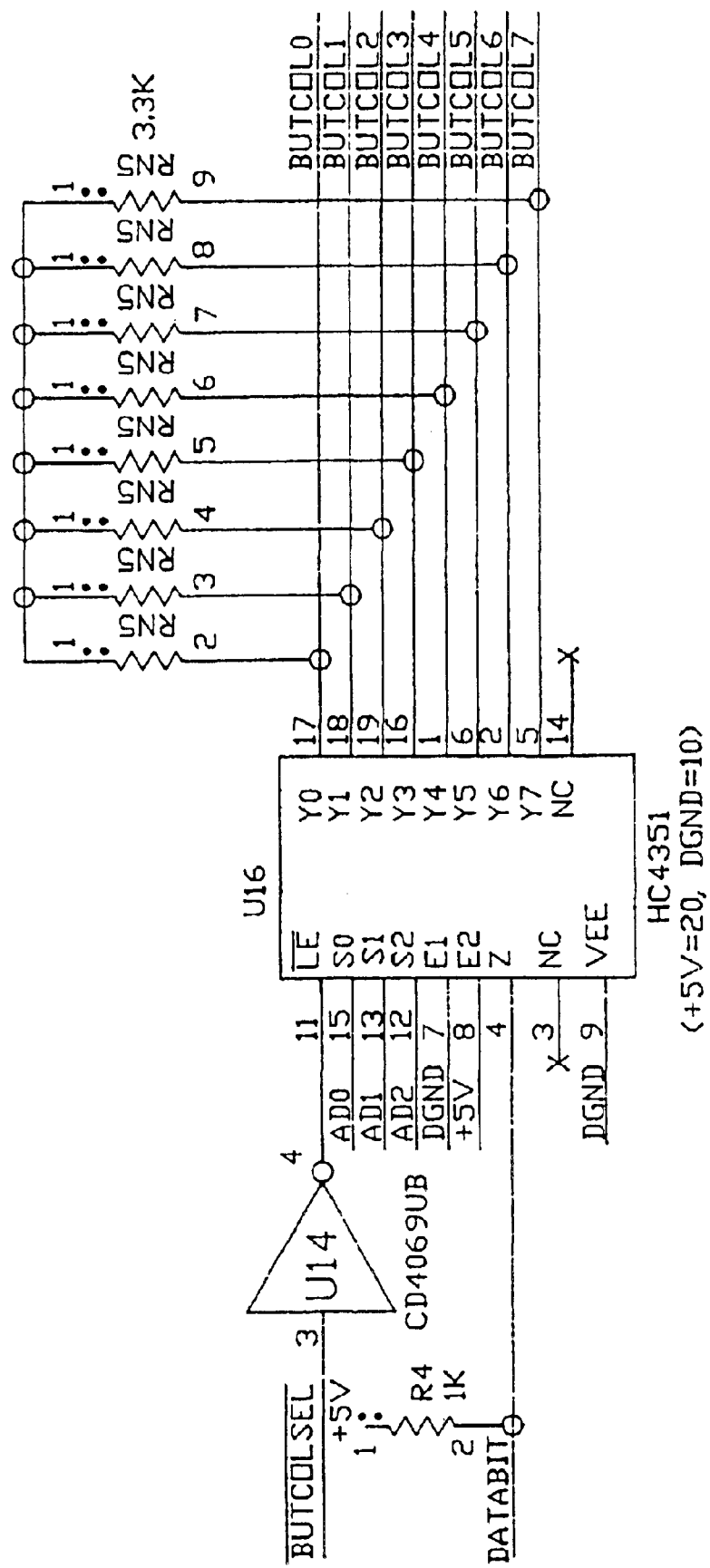

FIG. 28 shows block U17 which is an analogue switch available from Philips Semiconductor as component HC4351. Block U14 is an invertor commercially available as component CD4069UB and it has an input data line for selecting a button column. Basically, the DATABIT line is selectively connected to a column of the electronic memory devices; 53 by block U17. The resistors having values of 3.3 kilo ohm between the lines BUTCOL0 to BUTCOL7 represent a unique solution to a serious problem inhibiting the use of electronic memory devices in an array such as disclosed herein. The problem will be discussed so the remarkable solution can be appreciated.

The convenience of the electronic memory device 53 is that it is relatively, small and economical, and has the advantage of allowing the use of only two lines. Such a device is designed to operate at a predetermined voltage such as 5 volts. When an array of the electronic memory devices 53 is formed, it results in the inadvertent connection to electronic memory devices 53 which are not intended to be read. Typically, the electronic memory device 53 presents a resistance of about 500 Kohms so that the voltage across an electronic memory device 53 which as not been selected, but is in a close electrical path to the selected device 53, can be about 2 volts. This can be appreciated if the electrical circuit in FIG. 28 is considered with the 3.3 Kohm resistors replaced by direct connections, that is, shorted out of the operation. Even though the electronic memory devices were designed for operation at 5 volts, the low voltage can result in spurious readings and operations of the array. Surprisingly, the introduction of the 3.3 Kohm resistors surprisingly enables highly reliable operation of the array. A simple electrical analysis shows that the voltage across an electronic memory device 53 not be read is reduced about two orders of magnitude, for the worst case.

Basically, it has been found that in an array of electronic memory device 53 operable for being read by a two wire connection at a predetermined voltage level, the reliability and performance of the array is substantially improved by introducing resistance paths between any two lines connecting one side of each electronic memory device 53. Preferably, the resistance path is about two orders of magnitude less than the resistance of each of the electronic memory devices 53. That is, about one hundredth of the resistance of the electronic memory device 53.

Figure 29A:
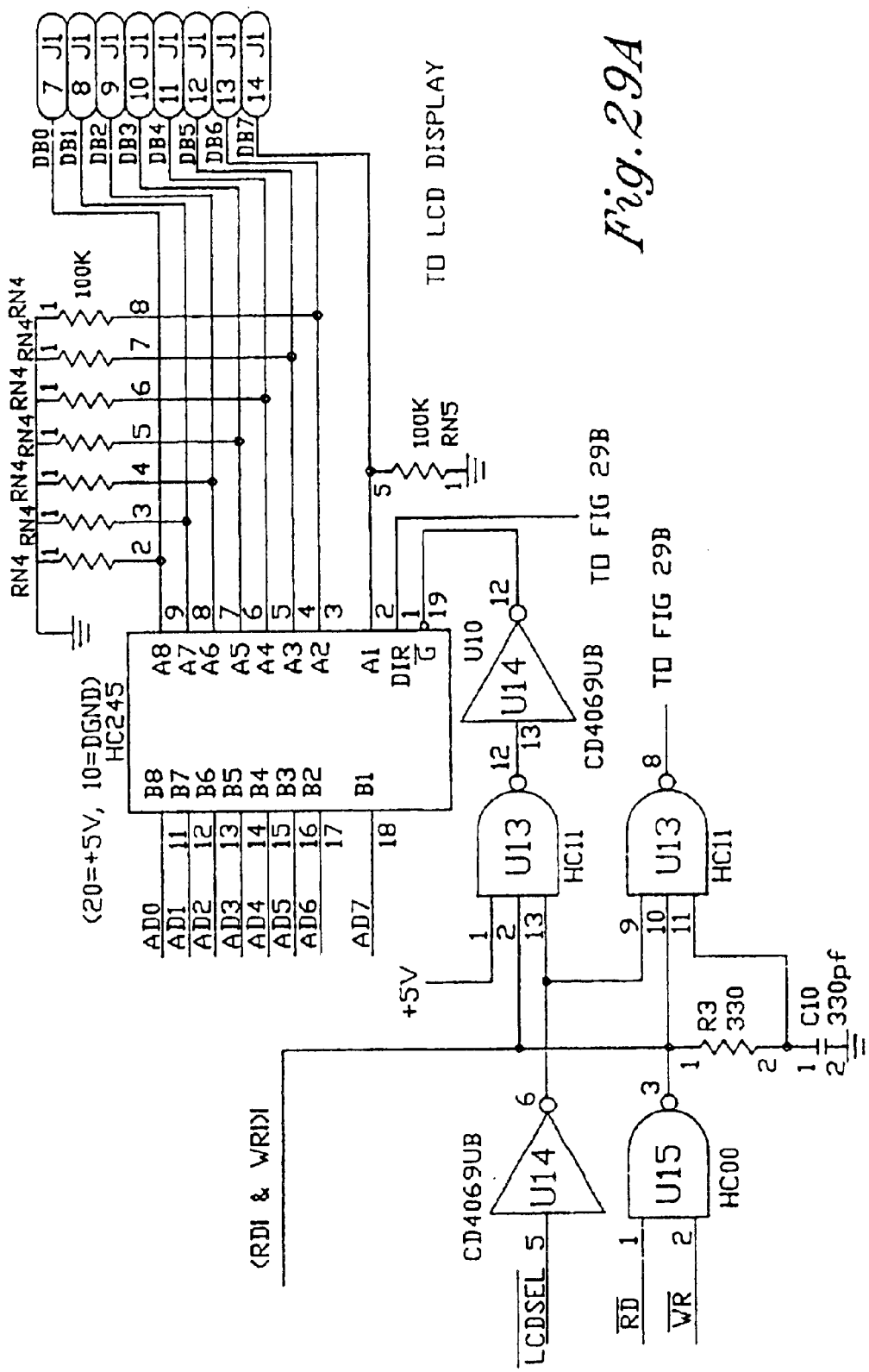
Figure 29B:
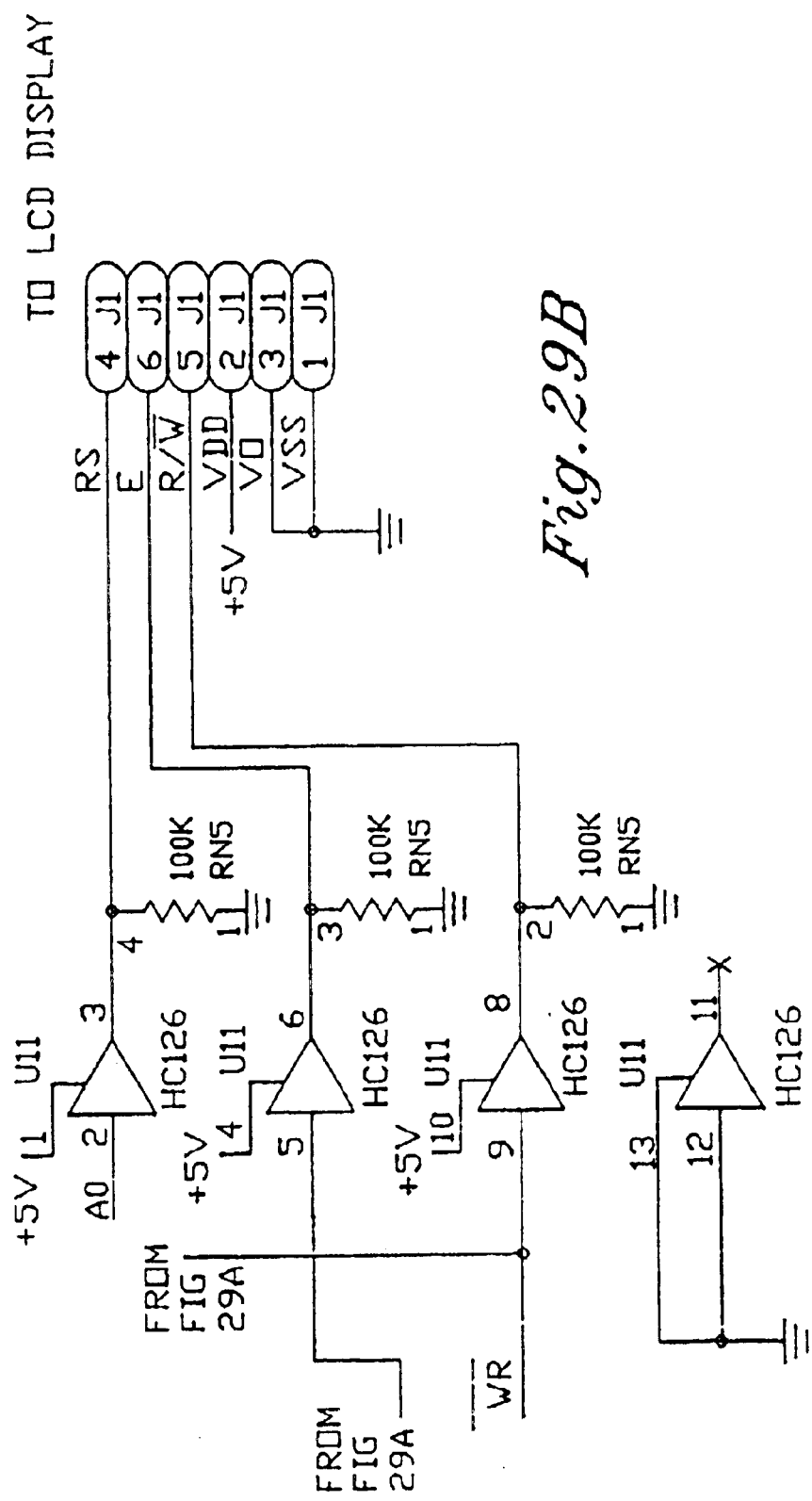

FIG. 29 shows a portion of the electrical circuit sewing as an interface to the liquid crystal display (LCD). Block U10 is a bidirectional buffer commercially available as component 74HC245. The block 14 is an invertor, block U15 is a NAND gate, block U13 is an AND gate and block U11 is a buffer.

Figures 30, 31:
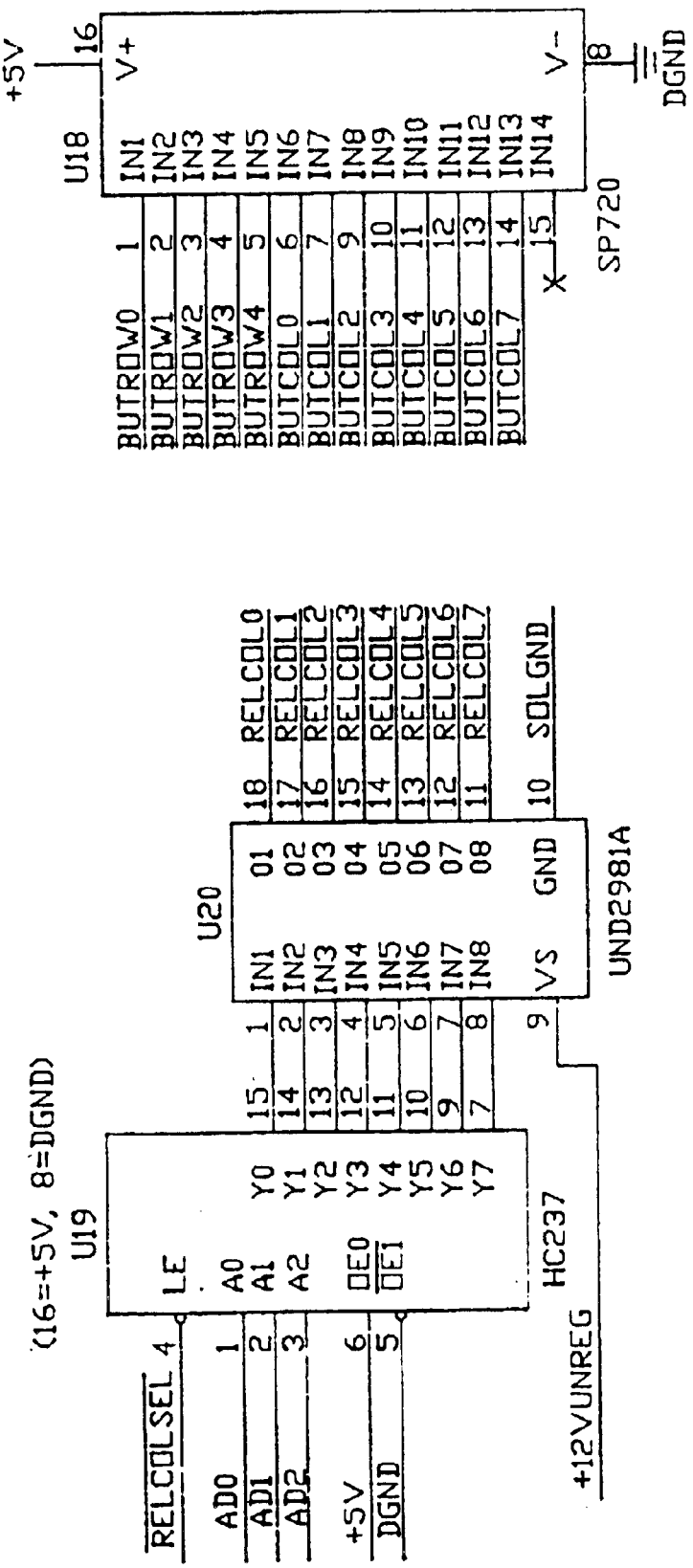

FIG. 30 shows block U19 which is latchable 3 to 8 decoder commercially available as component 74H0237.

Block U20 is commercially available from Spraque and is used to control the relays 46 by selectively applying the 12 volt source.

FIG. 31 shows block U18 which is a noise suppressor commercially available from Harris Semiconductor as component SP720.

Figure 32:
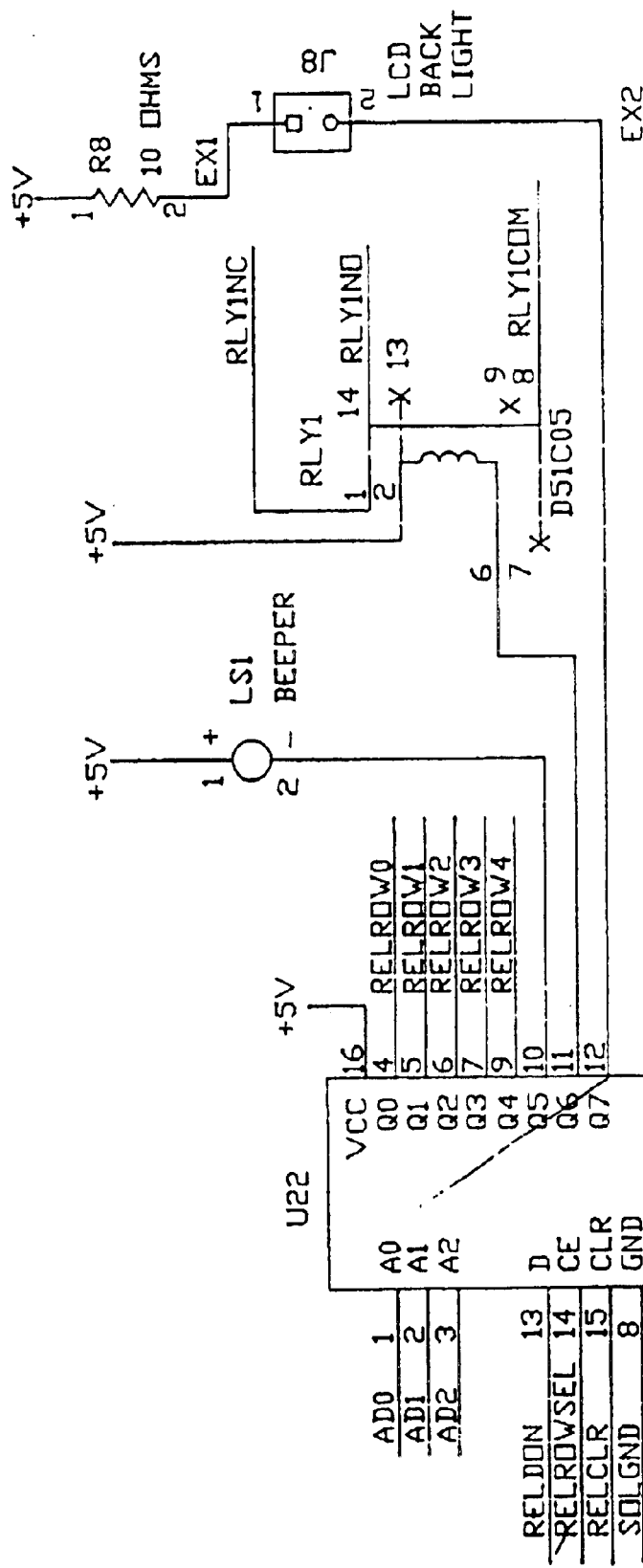

FIG. 32 shows block U22 which is an addressable relay driver available from Philips Semiconductor as component SA5099A This company also uses the letters "NE" at the start of its component designation. The beeper shown as LS1 is for an audio output to provide feedback as to the operations or indicate problems. Resistor R8 serves as a limiting resister for the current being supplied to the LCD backlight.

Figure 33:
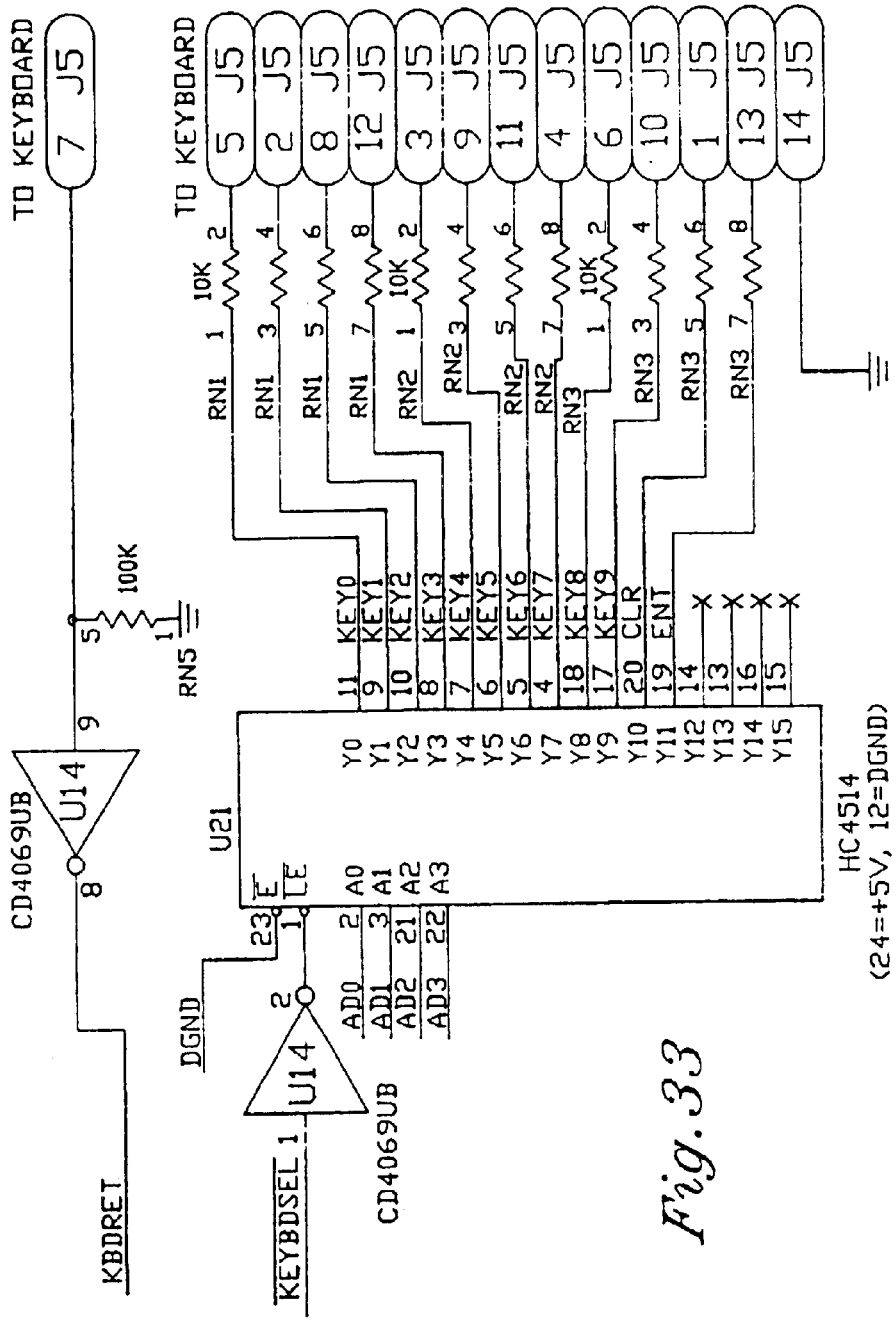

FIG. 33 shows a portion of the electrical circuit functioning as a keyboard interface. Block U21 is a 4 line to 16 line decoder commercially available as component HC4514.

Figure 34A:
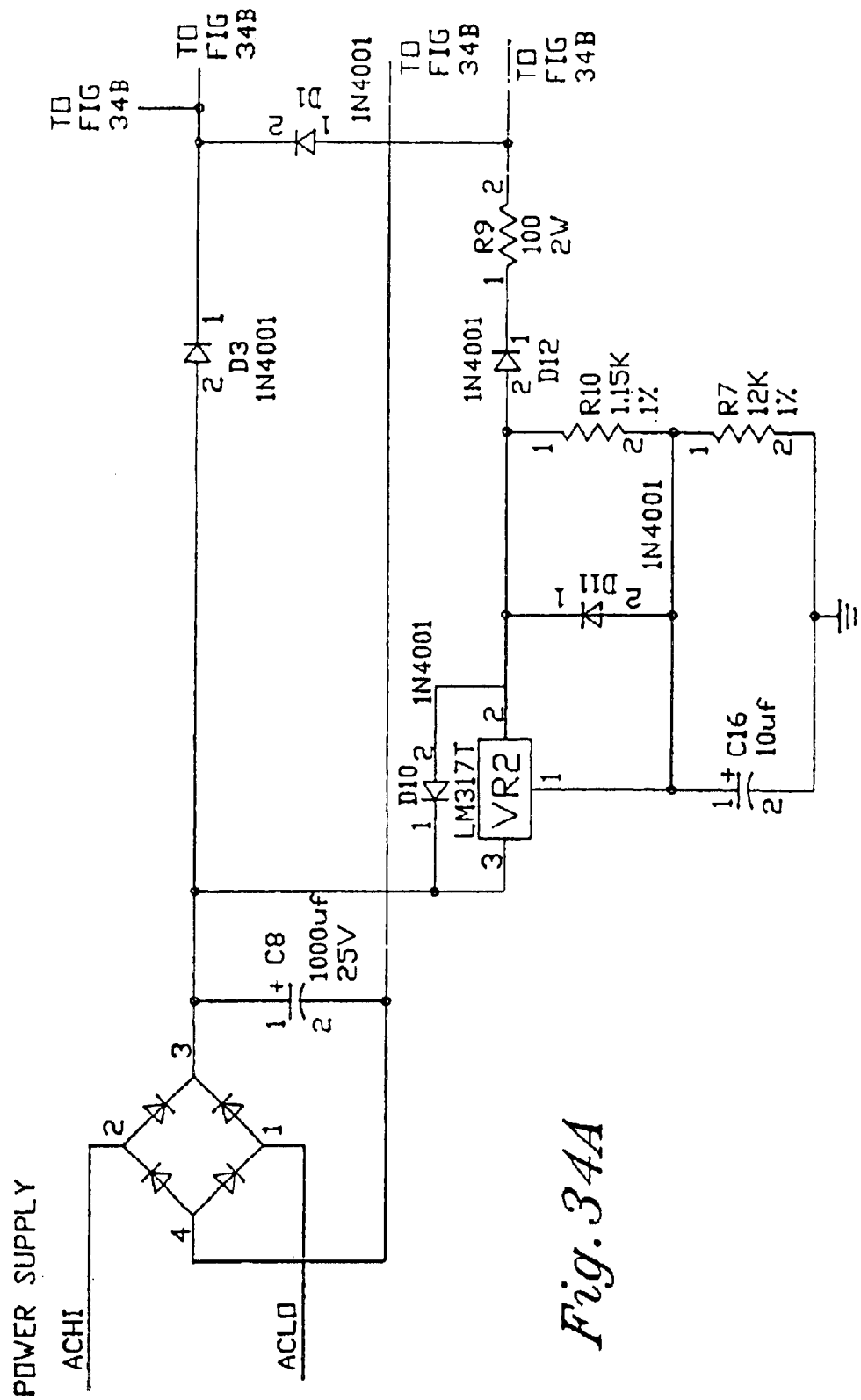
Figure 34B:
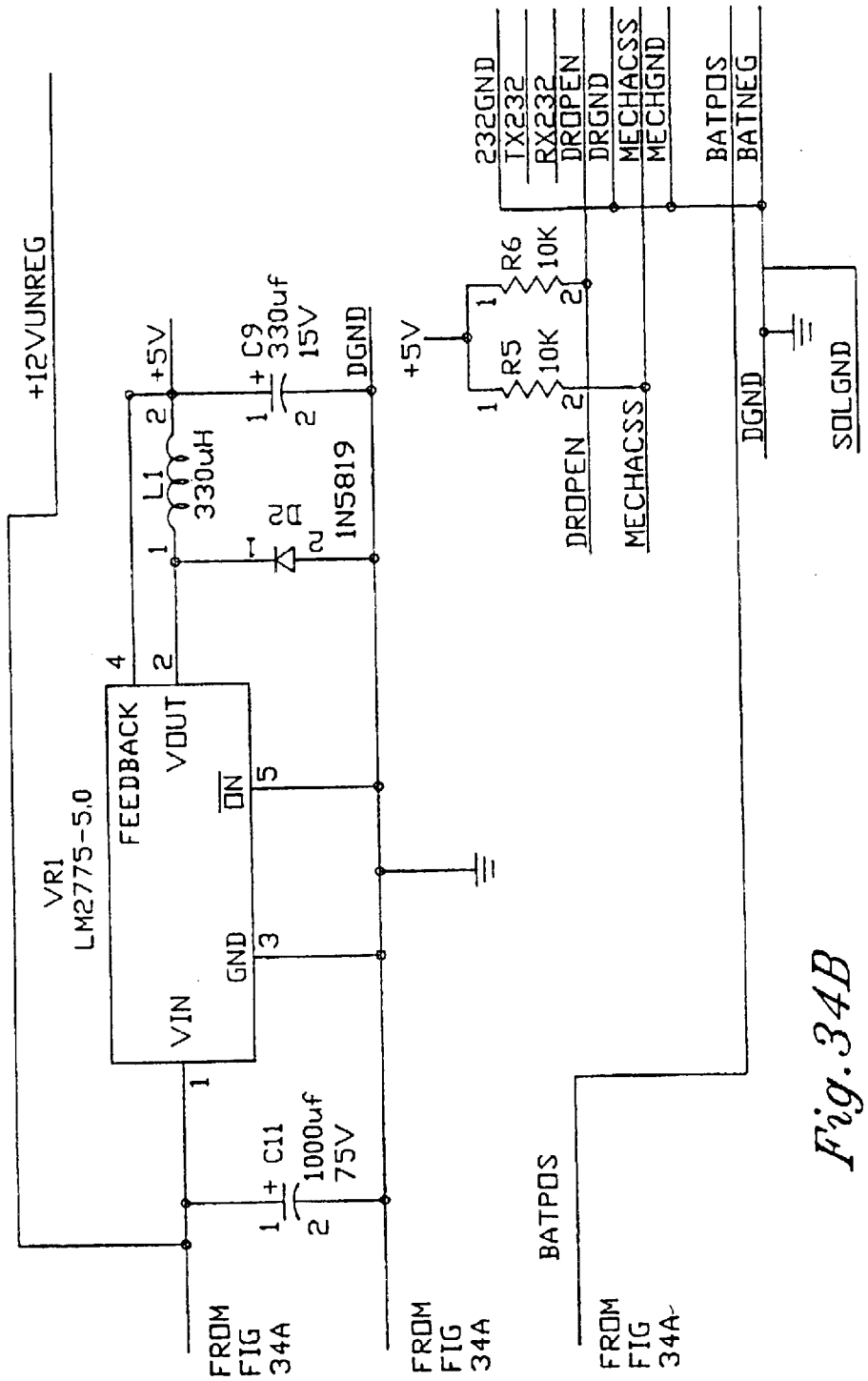

FIG. 34 show the power supply in accordance with well known design techniques. Block VR2 is an adjustable voltage regulator available from Motorola as component LM31TT. Block VR1 is a switching regulator available from Motorola as component 7805CTH. A Battery backup is preferably used and would operate through diode D1. A battery backup is maintained charged through line BATPOS.

Figure 35:
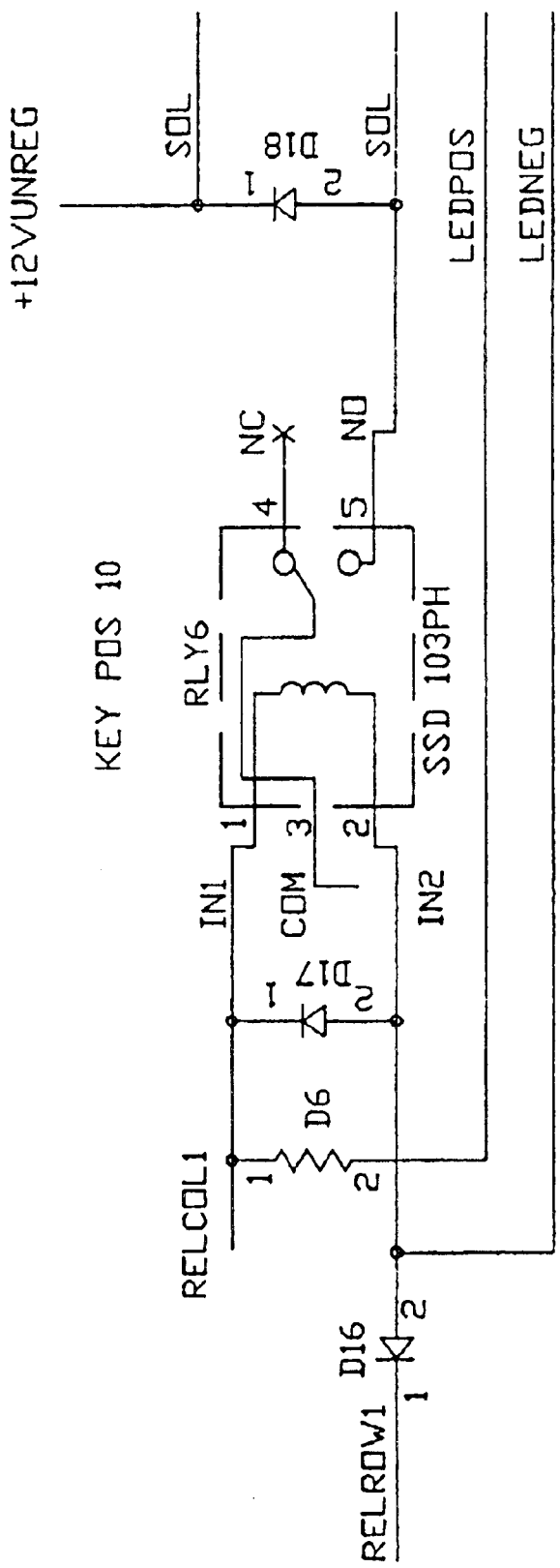

FIG. 35 shows the subcircuits mounted on the relay boards for controlling the relays 46. Each station 6 includes a solenoid 23 which is responsive to a relay 46. Each station 6 includes a solenoid 23 which is responsive to a relay 46. The position of a solenoid is defined by its coordinates and the circuit shown in FIG. 35 is for the solenoid 23 positioned at column 1, row 1. The relay RLY6 controls that solenoid. There is a similar subcircuit also provides the control for the corresponding LED 18 at the station 6.

Turning now to the flow diagrams, FIGS. 36–48 show the general operational steps for the storage system 1. Basically, the memory and computing operations of the storage system 1 become defined through the flow diagrams.

In general, the storage system 1 has certain information entered to establish a database for its operations. Typically, the information desirable for the database includes, a brief description of the key and the door identification or number as to the potential users, it is desirable to identify to first and last name of the user, the user's identification number, any password assigned to the user, the keys which will be accessible to the user, the time when the user must return the keys, and which keys the user has taken. Such information allows the preparation of reports with different contents directed at different requirements.

Figures 36, 36A:
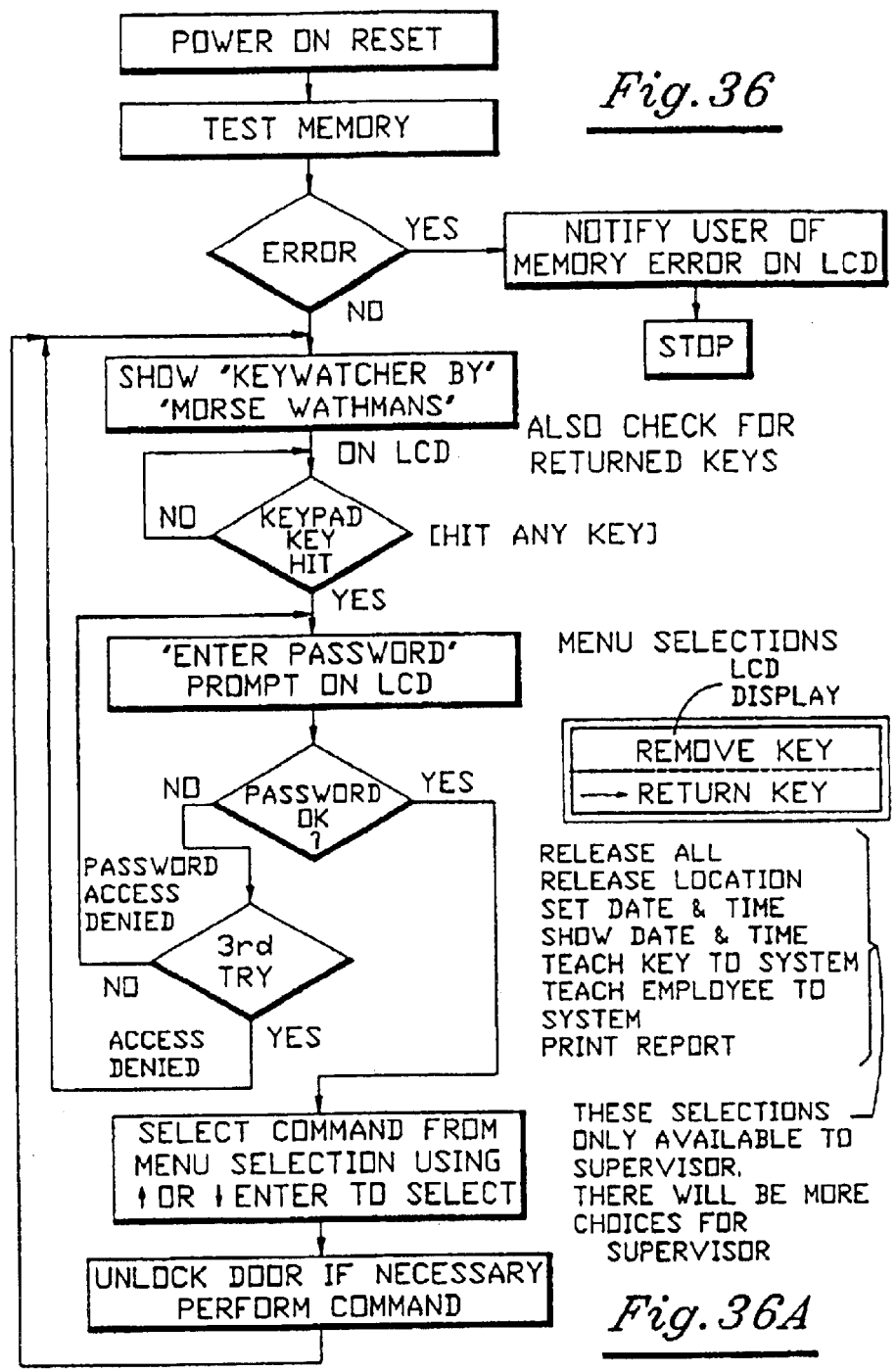
FIGS. 36–48 show flow diagrams for operating the storage system shown in FIG. 1.

FIG. 36 shows the top level functionality. When there is power on or power reset, the memory is tested to verify the system is operational. An error is indicated on the display. Otherwise, the display has a default legend. The initialization also checks for returned keys. The user then can use the keypad to enter a password which will, if accepted, provide a menu for further use as shown in FIG. 36A. Some of these menu items may be reserved for a supervisor so these items will not be displayed to users with limited access.

Figure 37:
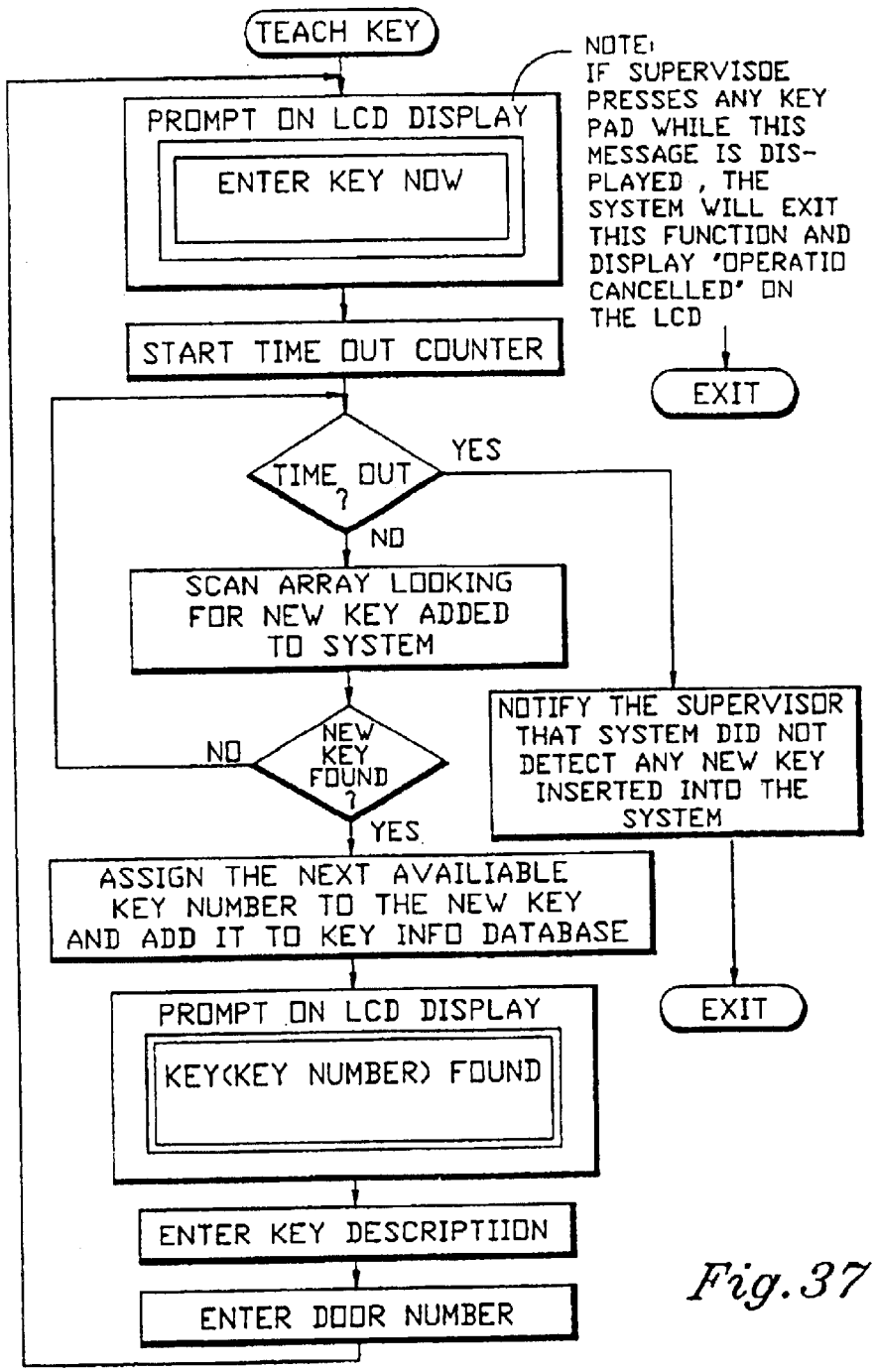
Figure 38:
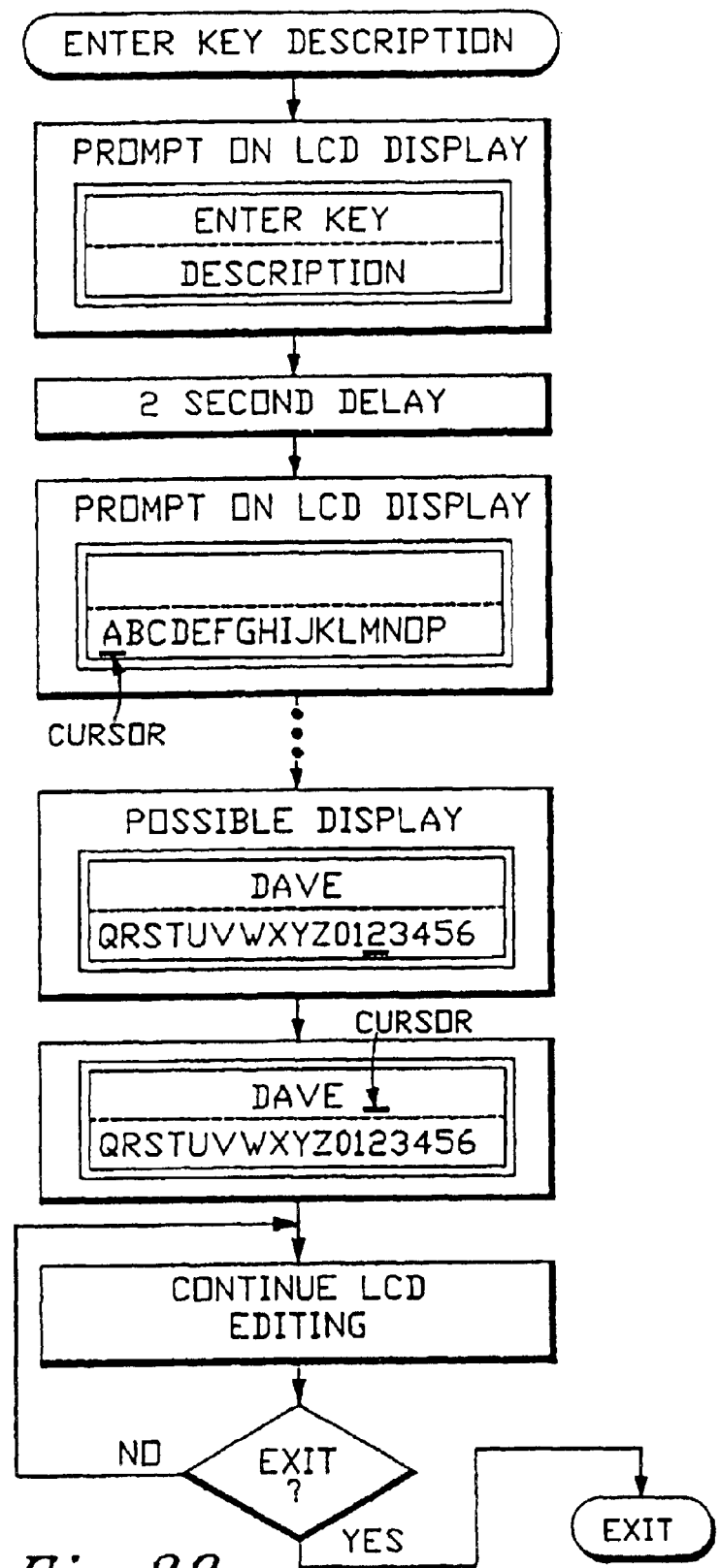
Figure 39:
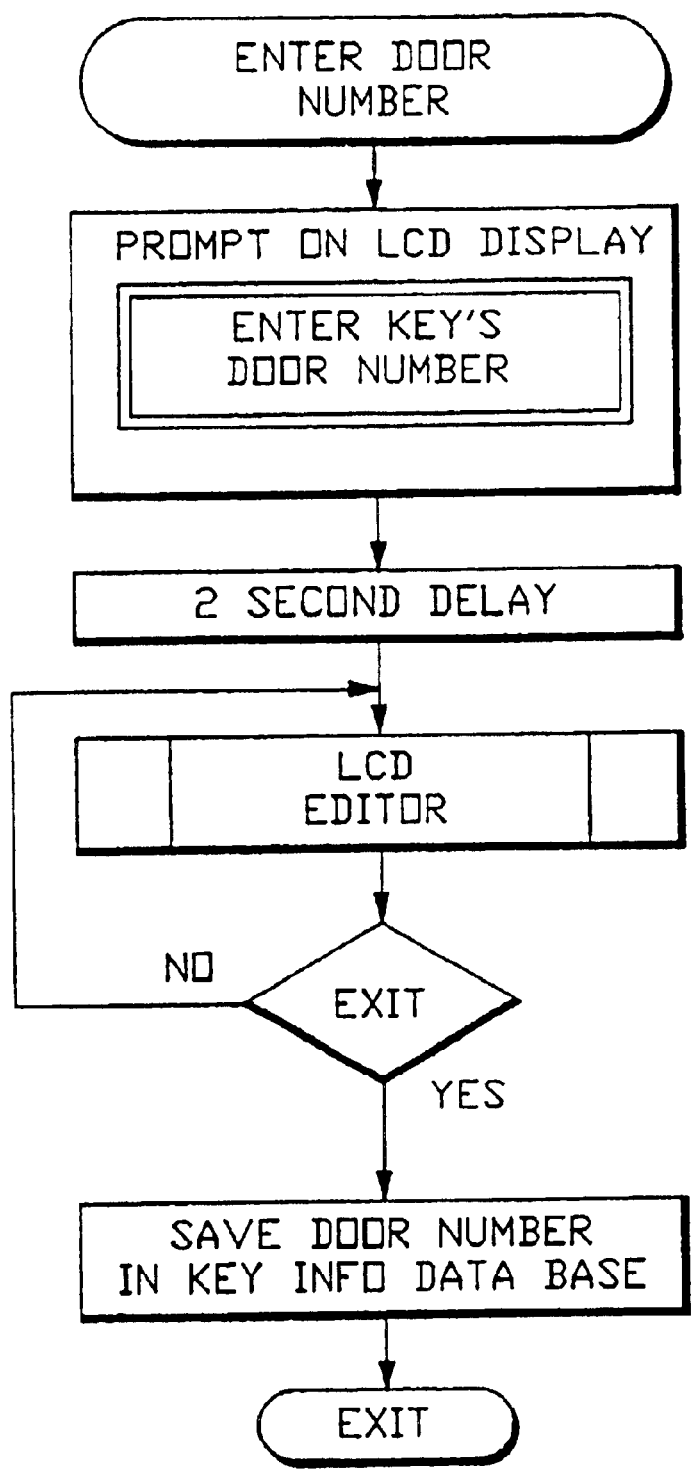
Figure 40:
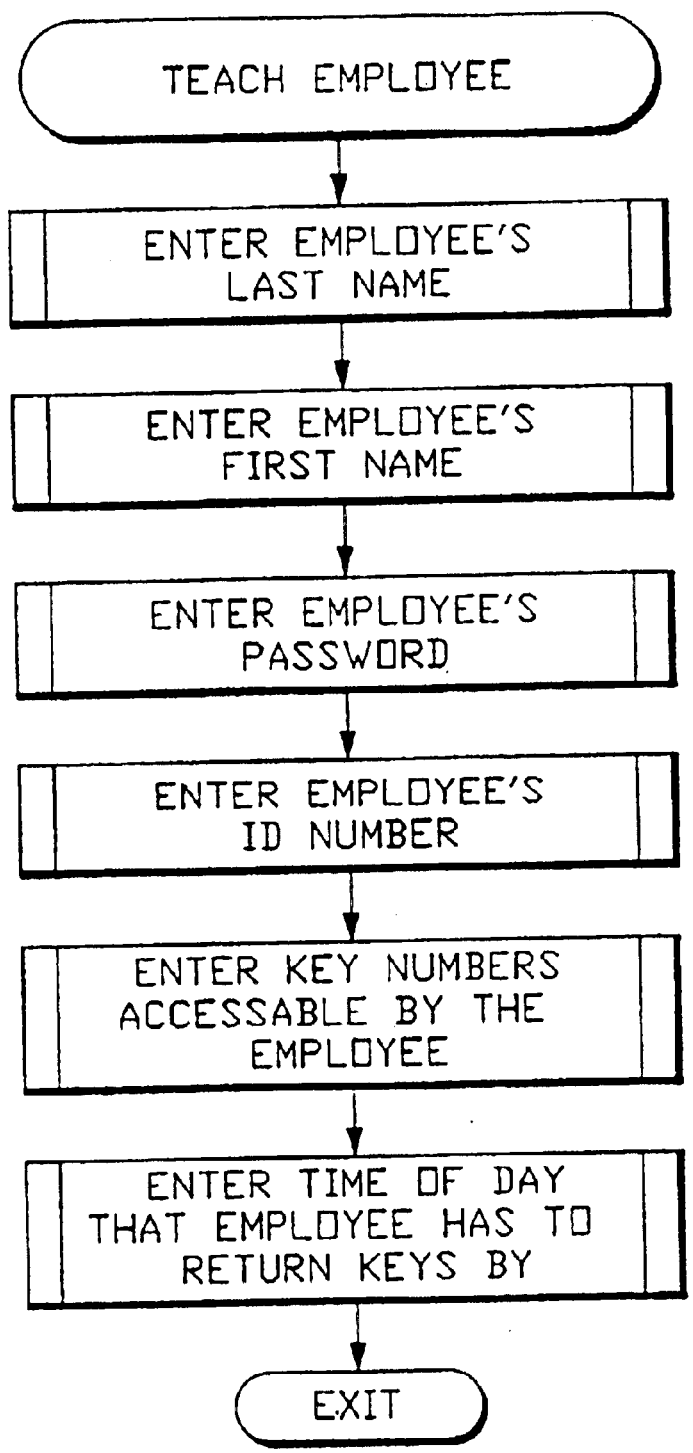
Figure 41:
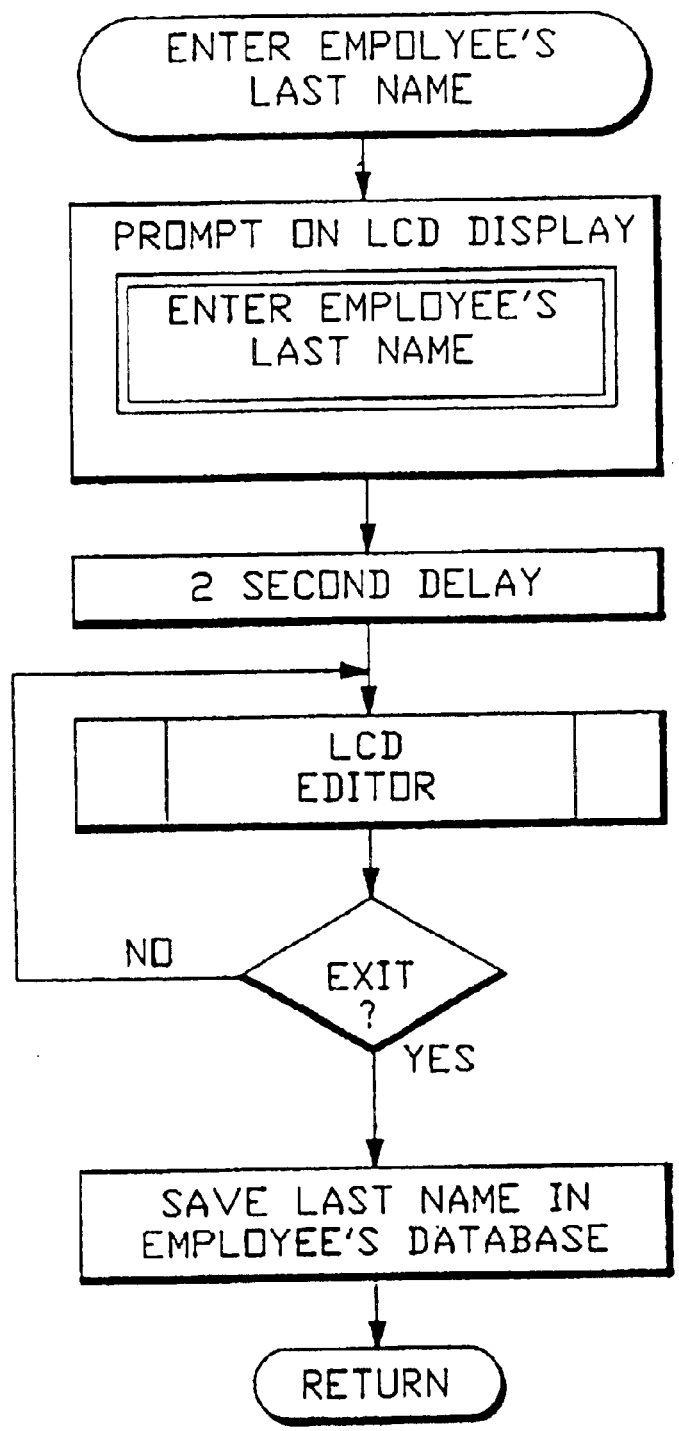
Figure 42:
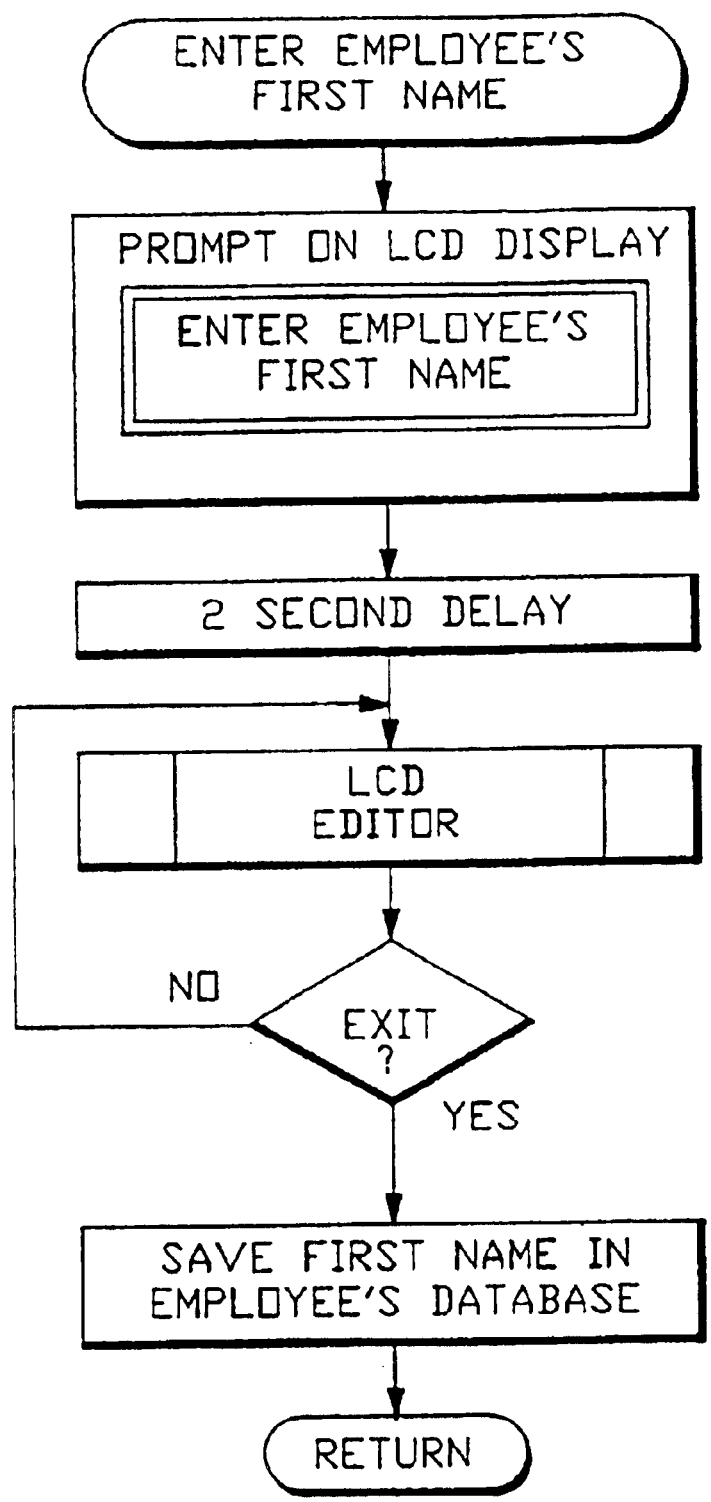
Figure 43:
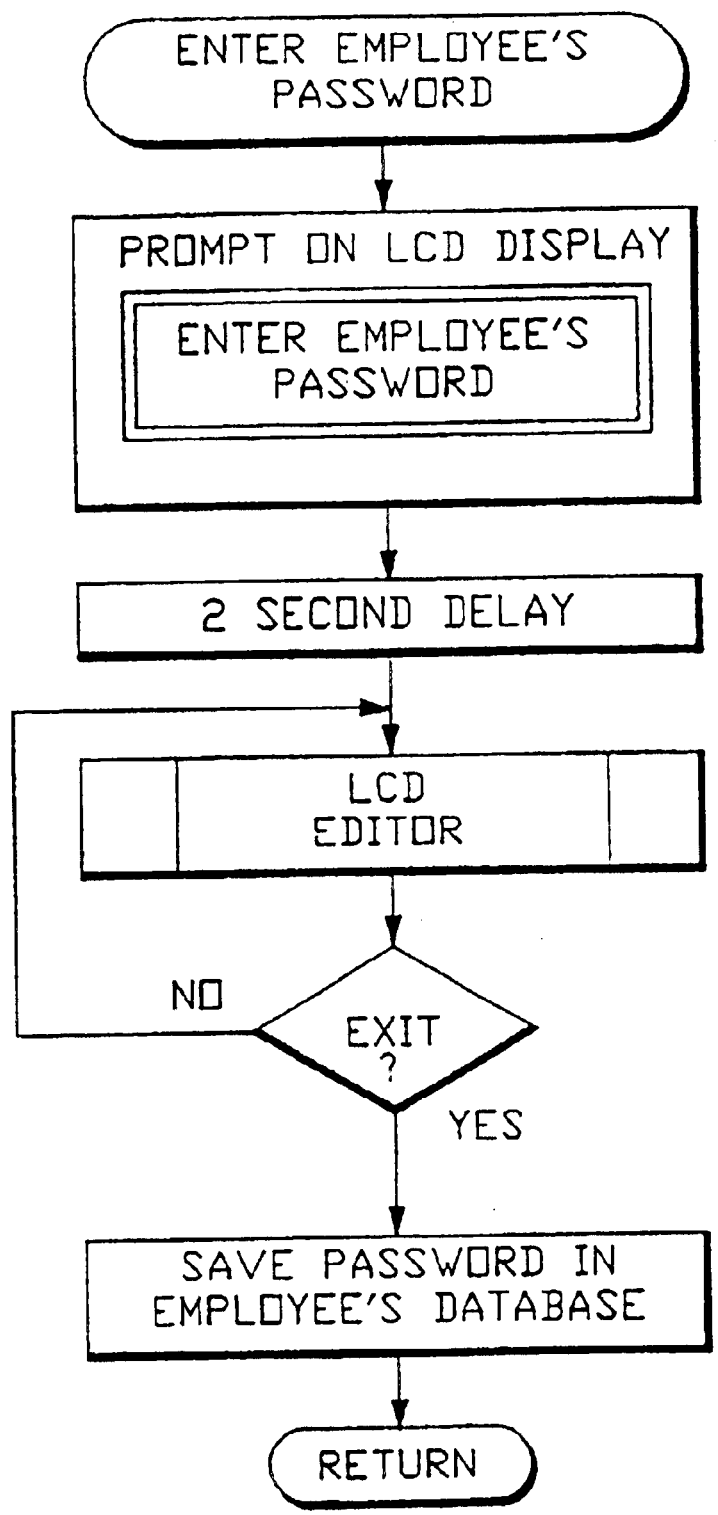
Figure 44:
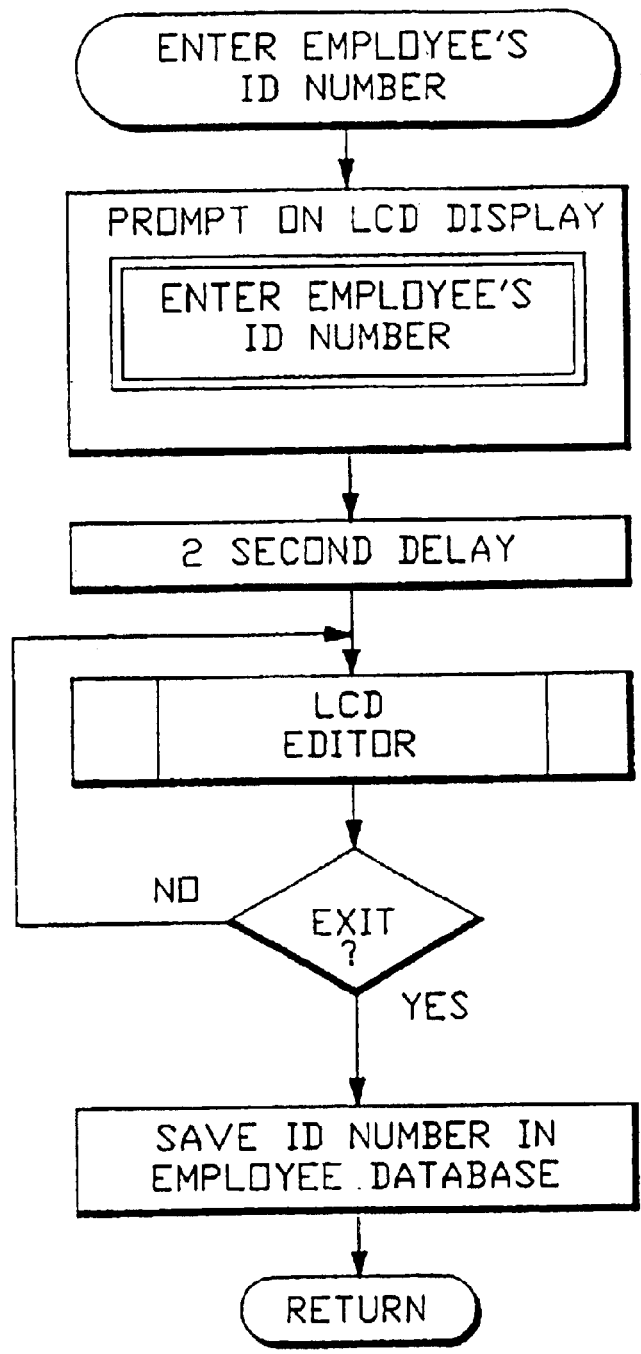
Figure 45:
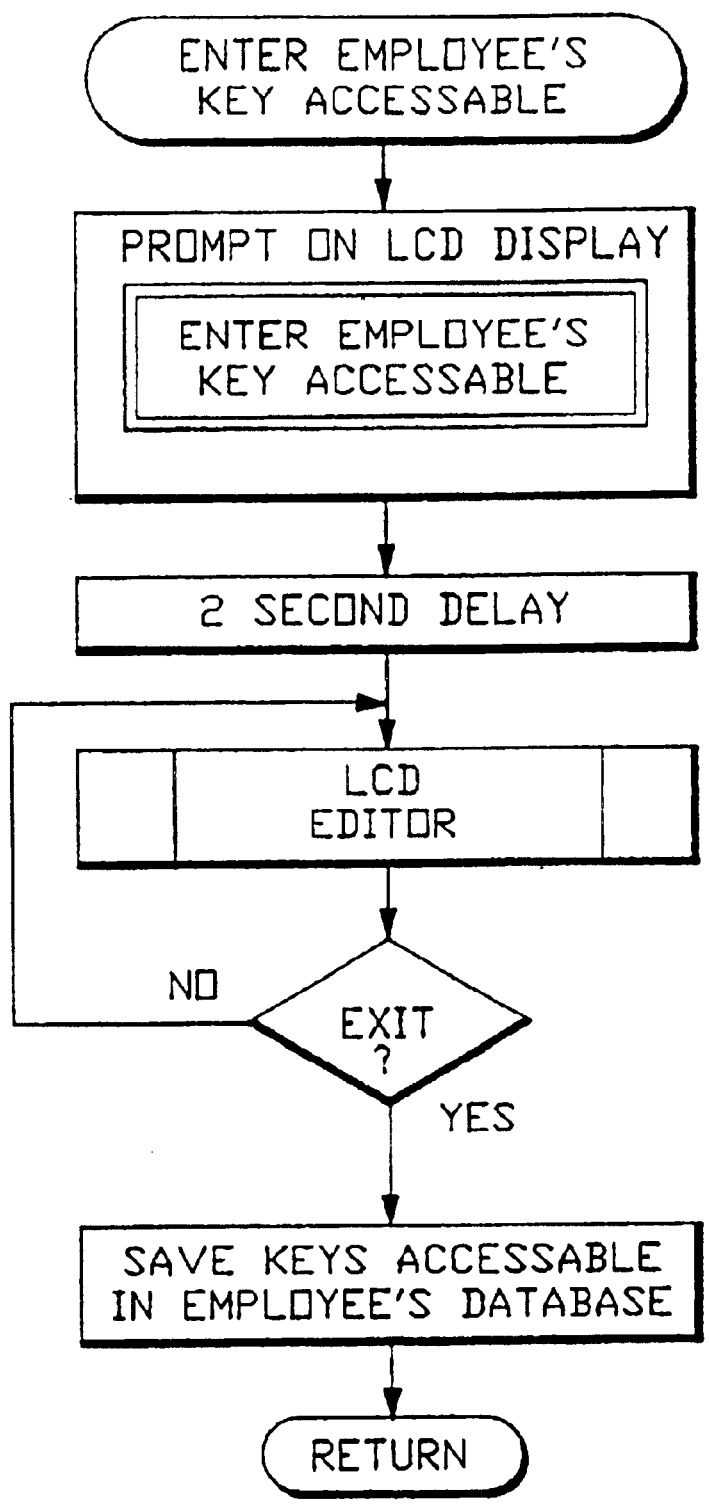
Figure 46:
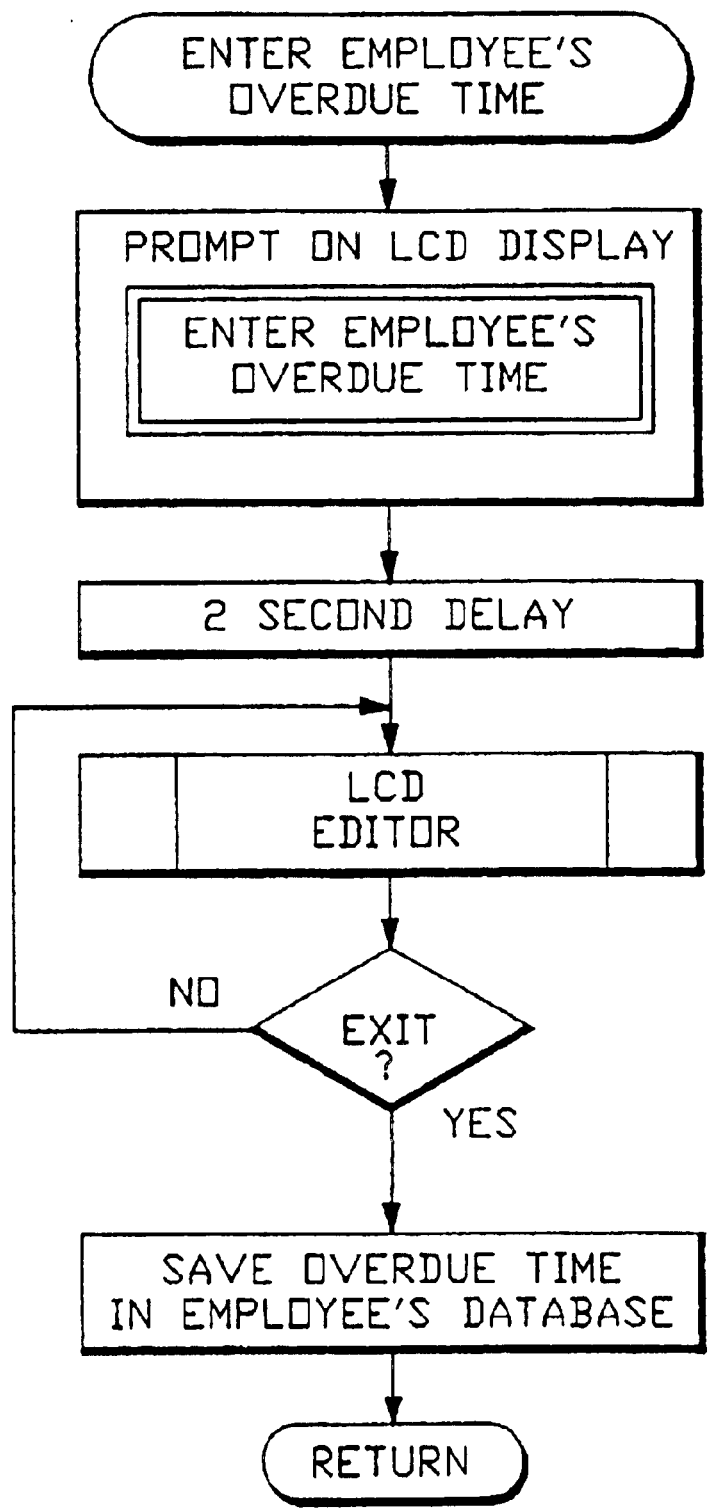

FIG. 37 shows the steps for "teaching" storage system 1 information as to key number, key description and door number. FIGS. 38 and 40 show more details for this operation. To enter information, such as a name, a letter is selected from the lower line of the display using the "arrow" keys to move the cursor. Pressing "enter" adds the selected character to the first line the "up" arrow allows the cursor to be moved to the first line so that the side arrows can be used to move the cursor right or left. A character can be erased using the "C" key. Pressing the "ENT" while the cursor is in the first line of the display will result in the information in the first line to be entered into the storage system 1. FIG. 39 shows the steps for entering a door number.

FIG. 40 shows the overall steps for entering information relating to an employee. FIGS. 41–46 show detailed steps.

Figure 47:
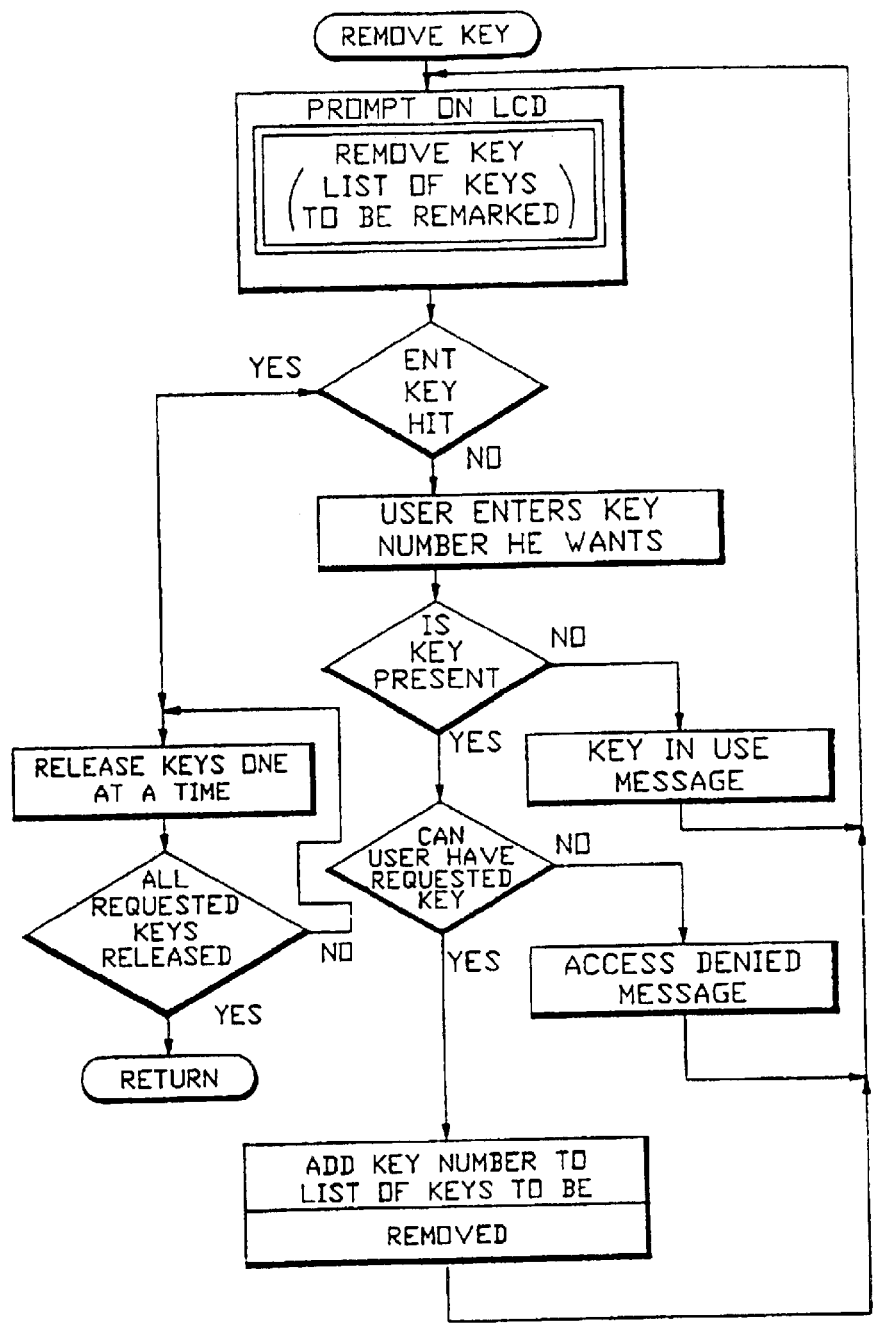
Figure 48:
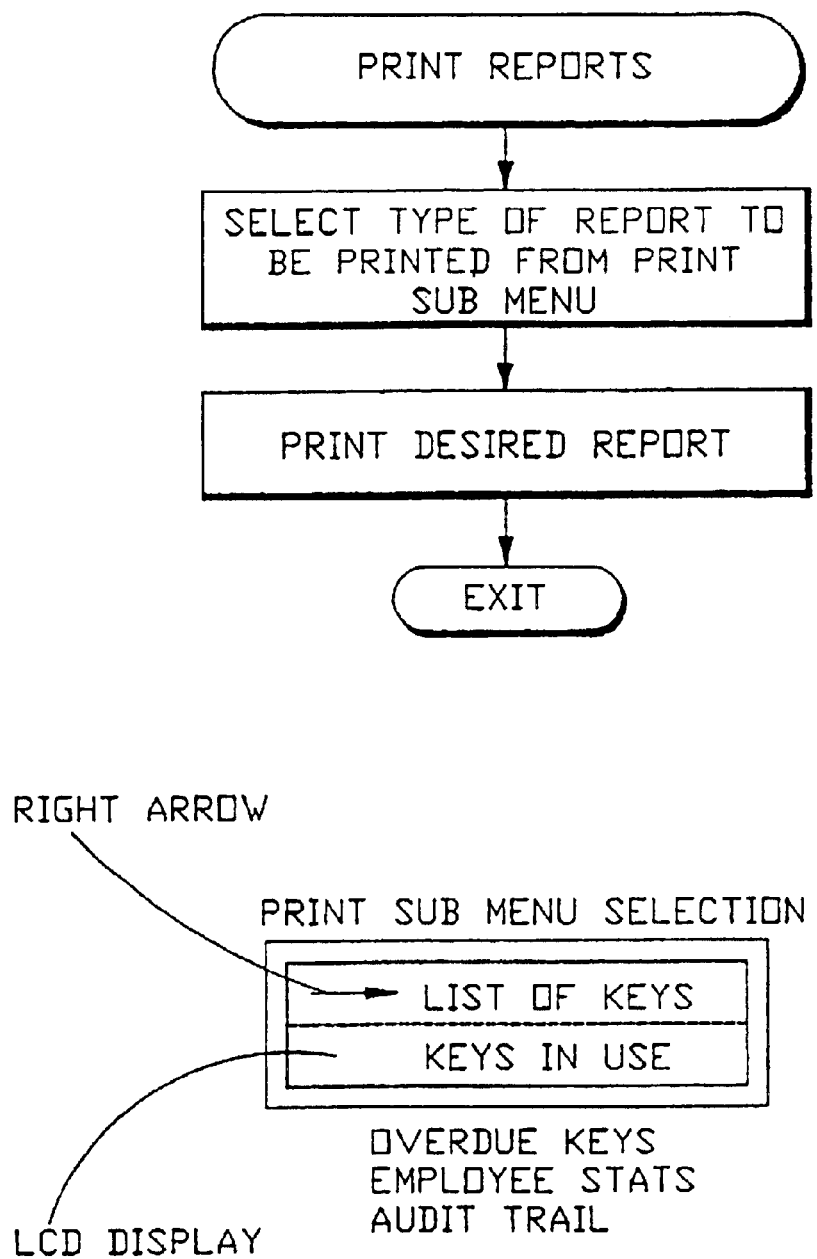

FIG. 47 shows the steps for removing a key and FIG. 48 shows the operations for print reports.

There has been described a novel accessory. It is evident that those skilled in the art may now make numerous uses and modifications of and departures from the specific embodiments described herein without departing from the inventive concepts. Consequently, the invention is to be construed as embracing each and every feature and novel combination of features present or possessed by the accessory herein disclosed and limited solely by the spirit and scope of the appended claims.

What is claimed is:

1. A storage system suitable for storing a plurality of objects each associated with an identification device, said system comprising:

an assembly including a plurality of locations arranged in a row column format, each of the locations adapted to receive an identification device;

row selector logic;

column selector logic;

an electronic memory device associated with each identification device, said electronic memory device comprising a first connection, a second connection and an individualized code;

a logic circuit for receiving a serial transmission of the individualized code generated between the first connection and the second connection of the electronic memory device at the intersection of a selected row and column;

wherein the transmission is initiated by signals across the first and second connections generated by the row selector circuit and the column selector circuit, which defines the intersection.

2. The system as claimed in claim 1, wherein the individualized code comprises a plurality of bits.

3. A storage system suitable for storing a plurality of objects each associated with an identification device, said system comprising:

an assembly having a plurality of locations each of which are adapted to receive an identification device;

an electronic memory device associated with each identification device, each electronic memory device including a first connection, a second connection and a serially transmittable individualized code;

addressing logic; and a logic circuit for receiving serial transmissions originating from the first connection from an addressed electronic memory device;

wherein the transmissions are initiated by signals at the first connection from the addressing logic.

4. The system as claimed in claim 3, wherein the individualized code comprises a plurality of bits.

5. A storage system suitable for storing a plurality of objects each associated with an identification device, said system comprising:

an assembly comprising a plurality of locations each of which are adapted to receive an identification device;

an electronic memory device, associated with each identification device, comprising a data connection, a ground connection and a serially transmittable individualized code;

logic circuits for signaling the data connection of a selected electronic memory device; and a logic circuit for receiving the serial transmission of the individualized code from the data connection of a signaled electronic memory device.

6. The system as claimed in claim 5, wherein the individualized code comprises a plurality of bits.

7. A storage system suitable for storing a plurality of objects each associated with an identification device, said system including an assembly having a plurality of locations each adapted to receive an identification device, said system comprising:

a two terminal electronic memory device, associated with an identification device, that includes a serially transmittable individualized code triggerable and receivable from the two terminals;

addressing logic to initiate transmissions of the individualized code from a selected memory device; and a processor to receive the serially transmitted individualized code and associate an identification device with a location.

8. The system as claimed in claim 7, wherein the individualized code comprises a plurality of bits.

9. A storage system suitable for storing a plurality of objects each associated with an identification device, said system comprising:

a plurality of mechanically coupled locations, each adapted to receive an identification device;

an electronic memory device, associated with each identification device, comprising a data connection and a ground connection and a serially transmittable individualized code;

addressing logic;

a processor;

wherein the addressing logic signals a memory device via its data and ground connections to transmit its individualized code and wherein the processor receives an individualized code originating from the data and ground connections and associates the individualized code with a location.

10. The system as claimed in claim 9, wherein the individualized code comprises a plurality of bits.

11. A storage system suitable for storing a plurality of objects each associated with an identification device, a plurality of mechanically coupled locations adapted to receive an identification device, said system comprising;

an electronic memory device, associated with each identification device, comprising a data connection, a ground connection and a serially transmittable individualized code;

addressing logic;

processing logic;

wherein the addressing logic signals a memory device via its data and ground connections to transmit its individualized code, and wherein the processing logic associates the individualized code with a location after receiving the code from the signaled data connection.

12. The system as claimed in claim 11, wherein the individualized code comprises a plurality of bits.

13. A storage system suitable for storing a plurality of objects each associated with an identification device, said system including an assembly having a plurality of locations each adapted to receive an identification device, said system comprising:

a two terminal electronic device associated with an identification device for transmitting an individualized code;

addressing logic to initiate transmissions from the two terminals of the electronic device; and a processor to receive a transmitted individualized code from the two terminals and associate the identification device with a location.

14. The system as claimed in claim 13, wherein the individualized code is serially transmittable and comprises a plurality of bits.

* * * * *